(12) United States Patent
Laine

(10) Patent No.: US 8,826,944 B1
(45) Date of Patent: Sep. 9, 2014

(54) BUILT IN APPLIANCE WITH A WATER LINE TUBE

(75) Inventor: Kyle Edward Laine, Newburgh, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 36 days.

(21) Appl. No.: 13/493,357

(22) Filed: Jun. 11, 2012

(51) Int. Cl.
*F16L 11/00* (2006.01)

(52) U.S. Cl.
USPC ............................ 138/118; 138/109; 138/177

(58) Field of Classification Search
USPC ................ 138/109, DIG. 8, 177, 178, 118; 285/321
See application file for complete search history.

(56) References Cited

U.S. PATENT DOCUMENTS

| | | | | |
|---|---|---|---|---|
| 4,037,861 A | * | 7/1977 | Medney | 285/147.1 |
| 4,218,812 A | * | 8/1980 | Jonsson | 29/402.12 |
| 4,410,281 A | * | 10/1983 | Crookes | 366/341 |
| 5,472,281 A | * | 12/1995 | Phelps | 383/43 |
| 5,691,747 A | * | 11/1997 | Amano | 345/167 |
| 5,706,360 A | * | 1/1998 | Khandekar | 381/370 |
| 6,119,769 A | * | 9/2000 | Yu et al. | 165/109.1 |
| 6,135,159 A | * | 10/2000 | Karl | 138/139 |
| 6,604,552 B2 | * | 8/2003 | Hansen et al. | 138/143 |
| 7,045,060 B1 | * | 5/2006 | Liles et al. | 210/199 |
| 7,516,989 B2 | * | 4/2009 | Yoshida | 285/321 |
| 7,699,356 B2 | * | 4/2010 | Bucher et al. | 285/321 |
| 8,070,995 B2 | * | 12/2011 | Campau et al. | 264/152 |
| 8,127,799 B2 | * | 3/2012 | Cortez | 138/97 |
| 8,485,230 B2 | * | 7/2013 | Laor et al. | 138/177 |
| 2010/0229990 A1 | * | 9/2010 | Cortez | 138/97 |

FOREIGN PATENT DOCUMENTS

| | | |
|---|---|---|
| EP | 1433993 A1 | 6/2004 |
| FR | 2218528 A1 | 9/1974 |
| JP | 1997004769 A | 1/1997 |

OTHER PUBLICATIONS

Alexander Slocum, "FUNdaMENTALS of Design, Topic 4, Linkages", published by Center for Integration of Medicine & Innovative Technology and Massachusetts Institute of Technology. Jan. 1, 2004, at http://web.mit.edu/2.75/resources/FUNdaMENTALs%20Book%20pdf/FUNdaMENTALs%20Topic%204.PDF.
Whirlpool Corp. Part No. 2302719 "Tube—Filter, Outlet", Apr. 5, 2006.
Whirlpool Corp. Part No. 2317912 "Tube—Filter, Outlet", Feb. 9, 2010.

* cited by examiner

Primary Examiner — Patrick F Brinson

(57) ABSTRACT

An appliance includes a machine compartment accessible from the exterior of the machine compartment. The machine compartment comprises at least a two components and a water line tube. The water line tube comprises at least three substantially straight sections and at least two formed bends in the tube. The tube is at least partially elastically rigid. The substantially straight sections and the formed bends allow the tube to move as if the tube was a linkage with the formed bends acting as constrained pivot points. The first tube end is fluidically attached to the first component. The second tube end is fluidically attached to the second component. At least one of the first component and the second component is at least partially removable from the machine compartment while the tube is fluidically connected to both the first component and the second component.

20 Claims, 18 Drawing Sheets

BUILT IN APPLIANCE WITH A WATER LINE TUBE

BACKGROUND

The present invention generally relates to a water line tube and, more specifically, to a water line tube connected between two components in an appliance.

SUMMARY

At times it may be desirable to service the components in an appliance from the front of the appliance. Some appliances such as built in refrigerators have components, such as a water valve or a filter, that may be serviced through the front of the appliance. When at least two of these components are connected to a water line tube, at least one of the components may have to be at least partially pulled out the front of the appliance or at least partially pulled out of the machine compartment in order to disconnect the tube from the component. The water line tube may need to be long enough to allow at least one of the components to be at least partially removed from the appliance.

When the components are in place in the machine compartment, the water line tube should fit inside the machine compartment and not rub on the various components located in the machine compartment. The water line tube should not be kinked or forced into a bend radius less than the recommended minimum bend radius for the tube material, diameter, and wall thickness. Bends with a bend radius of less than the minimum bend radius may reduce the long term reliability of the tube.

A flexible tube is easier to reposition in the machine compartment than a rigid tube. However, a flexible tube may have more potential to form leaks than a rigid tube.

In order to use a rigid tube in the machine compartment, it may be preferred to form bends that are less than the recommended minimum bend radius.

In order to connect a rigid tube between two components, a specific contour of a tube may be needed. Whirlpool part number 2302719 and part number 2317912 are examples of tubes with specific contours for specific locations of components in specific applications. Whirlpool part number 2302719 and part number 2317912 are hereby incorporated by reference.

These tubes allow for a least a partial removal of at least one component from the machine compartment while the tube is fluidically connected between two components. Stress may be induced in these tubes when a component is repositioned. The fluid connections to the components may be side loaded. The tube may rub against surfaces, edges, or components in the machine compartment. Repositioning the tube may potentially result in future leaks in the tube or at the tube connections.

Additionally, any change in the position of the connection locations due to tolerances, due to component changes, or due to position changes of the components in the machine compartment, may also induce stress into the tube or the tube fluid connections. The example tubes are useful primarily for only a specific configuration of components in a given machine compartment. Additional tube contours may be needed for even minor changes in machine compartment configurations or component design.

There is a need for a water line tube that is rigid to improve the reliability of the connections and reduce the potential for leaks. A water line tube formed out of rigid material is less flexible and may not easily be coiled up inside the machine compartment or pulled out of the compartment.

There is a need for a water line tube that allows at least one of the first component and the second component to be at least partially removed from the machine compartment while the tube is still fluidically connected to both components without resulting in unacceptable stress on the fluid connections or in the tube.

There is a need for flexibility in the water line tube so that a single tube contour can be used with multiple connection locations to accommodate tolerance stackup, minor changes in the positioning of components in the machine compartment, or changes in the design of each component.

In one aspect of the present invention, an appliance includes at least a machine compartment accessible from the exterior of the machine compartment. The machine compartment comprises at least a first component, a second component, and a water line tube. The water line tube comprises at least a tube outer diameter, a first tube end, a second tube end, and a passage to carry fluid there through. The water line tube further comprises a first substantially straight section adjacent the first tube end, a first formed bend adjacent the first substantially straight section, a second substantially straight section adjacent the first formed bend, a second formed bend adjacent the second substantially straight section, a third substantially straight section adjacent the second formed bend, a third formed bend adjacent the third substantially straight section, a fourth substantially straight section adjacent the third formed bend and adjacent the second tube end. The water line tube is formed at least in part from an elastically rigid material. The first tube end is fluidically attached to the first component. The second tube end is fluidically attached to the second component. At least one of the first component and the second component is at least partially removable from the machine compartment while the tube is fluidically connected to both the first component and the second component.

In another aspect of the present invention, a water line tube is fluidically attachable to a first component and to a second component in a machine compartment located in an appliance. The water line tube comprises at least a tube outer diameter, a first tube end, a second tube end, and a passage to carry fluid there through. The water line tube further comprises a first substantially straight section adjacent the first tube end, a first formed bend adjacent the first substantially straight section, a second substantially straight section adjacent the first formed bend, a second formed bend adjacent the second substantially straight section, a third substantially straight section adjacent the second formed bend, a third formed bend adjacent the third substantially straight section, a fourth substantially straight section adjacent the third formed bend and adjacent the second tube end. The tube is formed at least in part from an elastically rigid material.

These and other features, advantages and objects of the present invention will be further understood and appreciated by those skilled in the art upon studying the following specification, claims, and appended drawings.

DETAILED DESCRIPTION OF EMBODIMENTS

Figure 1A:
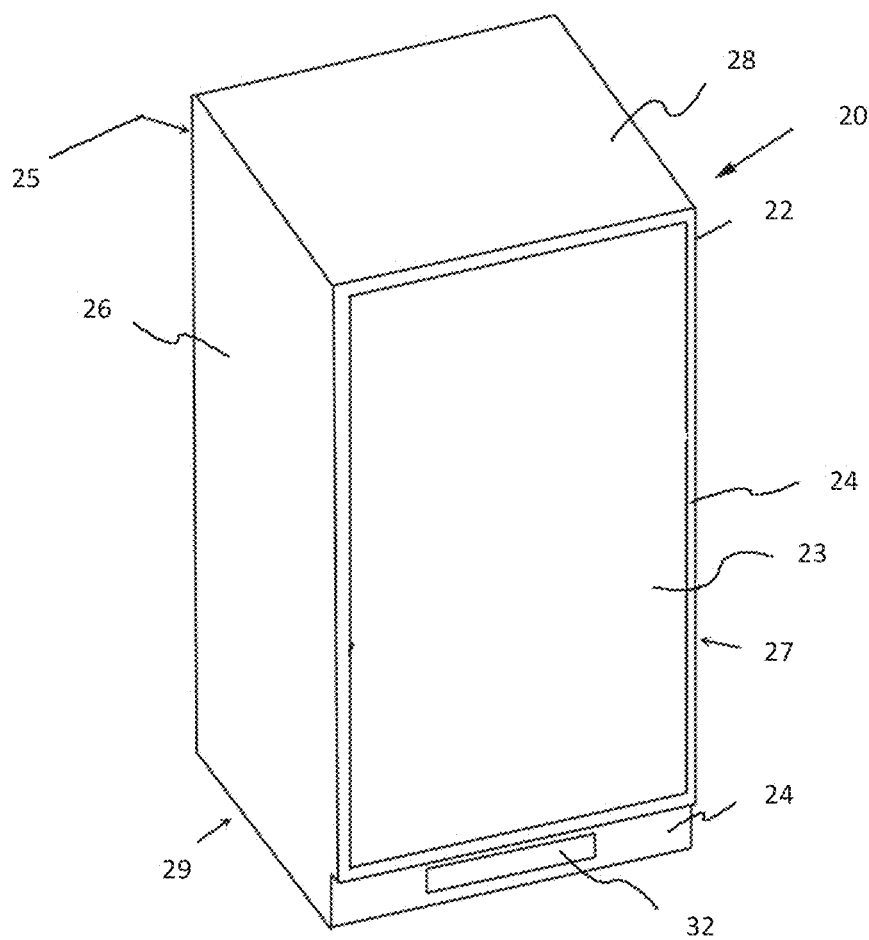
FIG. 1A shows a front prospective view of an appliance incorporating one embodiment of the present invention.

For purposes of description herein the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

For purposes of description herein the term "minimum allowed bend radius of a substantially straight section of tube", also referred to as "minimum allowed bend radius" or "minimum bend radius", shall relate to the minimum recommended bend radius of a material when formed into a tube of a specified outer diameter and a specific tube wall thickness. The minimum bend radius can be based on an industrial standard or on the material supplier's recommendation. The bend radius of a tube is measured based on the inside curvature of an arcuate. Bends with less than the minimum bend radius may weaken over time. Cracks may also form.

The term "bend" shall relate to a substantially arcuate segment, substantially arcuate section, or a substantially arcuate portion of a tube.

The term "force-to-bend" shall relate to the amount of force required to induce bending of a minimum tube length of a substantially straight section of tube around a specified radius. A more flexible tube has a lower "force-to-bend" than a less flexible tube.

The term "minimum tube length to make a bend" shall relate to: Minimum tube length to make a bend=$2\pi \times$(bend radius)$\times$(bend angle/360)

The term "formed bend" shall relate to a substantially arcuate bend formed in a tube using a secondary process step on an extruded tube, a bend in the tube formed at the time of molding, a process of heating the tube and forming a bend, or the like. A "formed bend" is a substantially arcuate shape that is present in the tube contour when the tube is unconstrained.

The term "unconstrained bend radius" shall refer to an approximate measurement of the tube bend radius when the tube is unconstrained and measured based on the inside curvature of an arcuate segment. The bend radius may also be measured from the outside curvature of an arcuate segment or alternatively from the approximate centerline of the arcuate segment and then adjusted based on the tube outer diameter.

The term "unconstrained bend angle" shall refer to an approximate measurement of the tube bend angle when the tube is unconstrained and measured based on the inside curvature of an arcuate segment. The bend angle may also be measured from the outside curvature of an arcuate segment or alternatively from the approximate centerline of the arcuate segment and then adjusted based on the tube outer diameter.

For purposes of description herein, the term "flexible" shall relate to a material that, when formed into a tube with a specific tube outer diameter and specific tube wall thickness, at least a portion of the tube may readily change shape from a substantially straight section into a substantially arcuate section when a side load force is applied to a substantially straight section of the tube at a distance of about the minimum bend radius from a constrained location on the tube. An example of a flexible tube may be a garden hose. A section of garden hose may bend into an arc shape when a force is applied.

For purposes of description herein, the term "rigid" shall relate to a material that, when formed into a tube with a specific tube outer diameter and specific tube wall thickness, a) resists changing shape from a substantially straight section into an arcuate section when a side load force is applied to a substantially straight section of the tube at a distance of about the minimum bend radius from a constrained location on the tube, and b) resists changing at least one of a bend angle and a bend radius of a substantially arcuate segment when a side load force is applied to the substantially arcuate segment at a distance of about the minimum bend radius from a constrained location on the arcuate segment. An example of a rigid tube may be a galvanized metal pipe. A section of galvanized metal pipe withstands a substantial amount of force before the galvanized metal pipe will bend.

For purposes of description herein, the term "elastically rigid" shall relate to a material that, when formed into a tube with a specific tube outer diameter and specific tube wall thickness, a) resists changing shape from a substantially straight section into an arcuate section when a side load force is applied to a substantially straight section of the tube at a distance of about the minimum bend radius from a constrained location on the tube, and b) may change at least one of a bend angle and a bend radius of a substantially arcuate segment when a side load force is applied to a substantially arcuate segment at a distance of about the minimum bend radius from a constrained location on the arcuate segment. The Whirlpool part number 2317912 tube is an example of a tube having formed bends demonstrating the elastic properties of the formed bends where the substantially straight sections will bend under a load. The Whirlpool part number 2317912 tube is not "elastically rigid" since both requirements are not met.

A tube formed out of a specific material may be flexible, elastically rigid, or rigid depending on the specific material, the molding process, the forming process, the specific tube contour, the tube outer diameter, or the tube wall thickness.

Figure 1B:
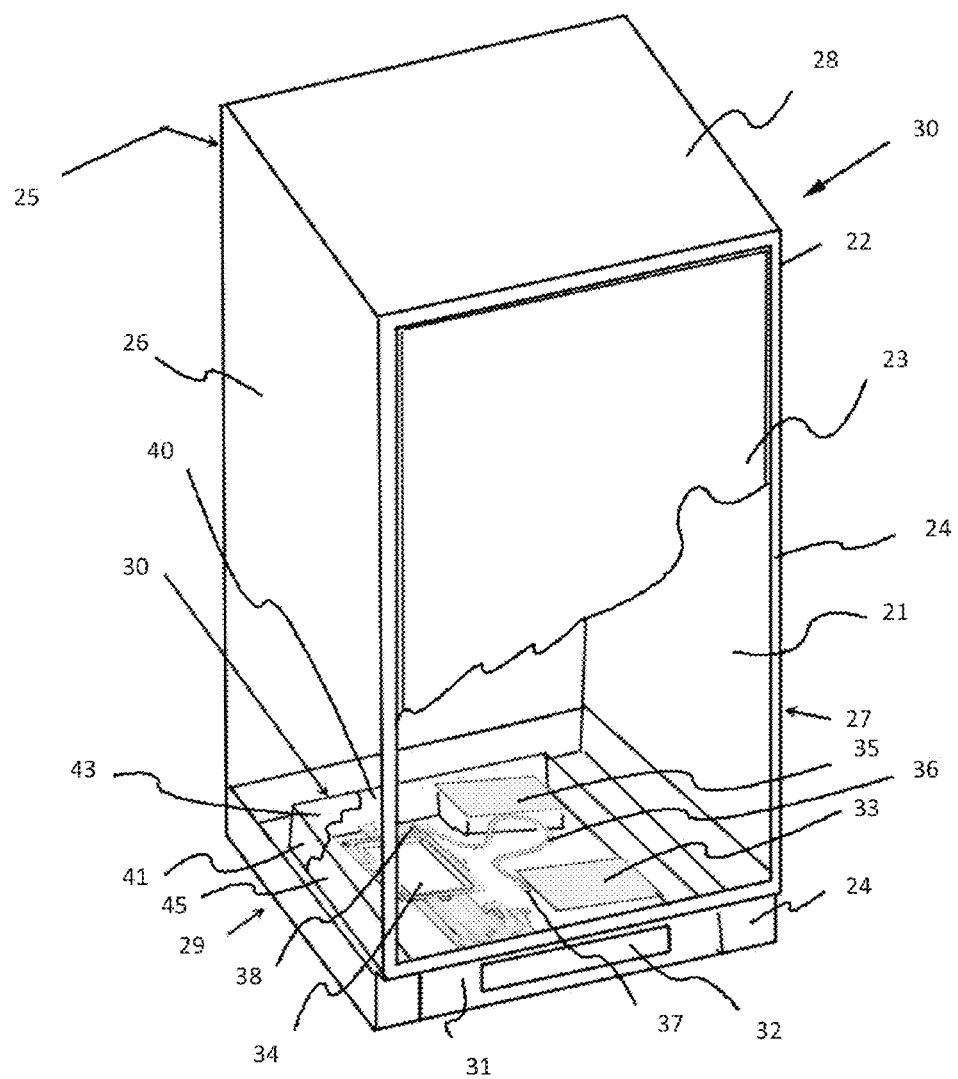
FIG. 1B shows a cut away front prospective view of the appliance incorporating an embodiment of the present invention.

The reference numeral 20 shown in FIG. 1A generally designates an appliance 20 having at least an appliance exterior 22, an appliance interior 21, and an appliance access 23. The appliance exterior 22 may have a front 24, a back 25, a first side 26, a second side 27, a top 28, and a bottom 29. Referring to FIG. 1B, the appliance 20 may have a machine compartment 30 located at least partially inside the appliance 20. The machine compartment 30 may have a machine compartment exterior 31 with at least one machine compartment opening 32 to the machine compartment 30.

Figure 2:
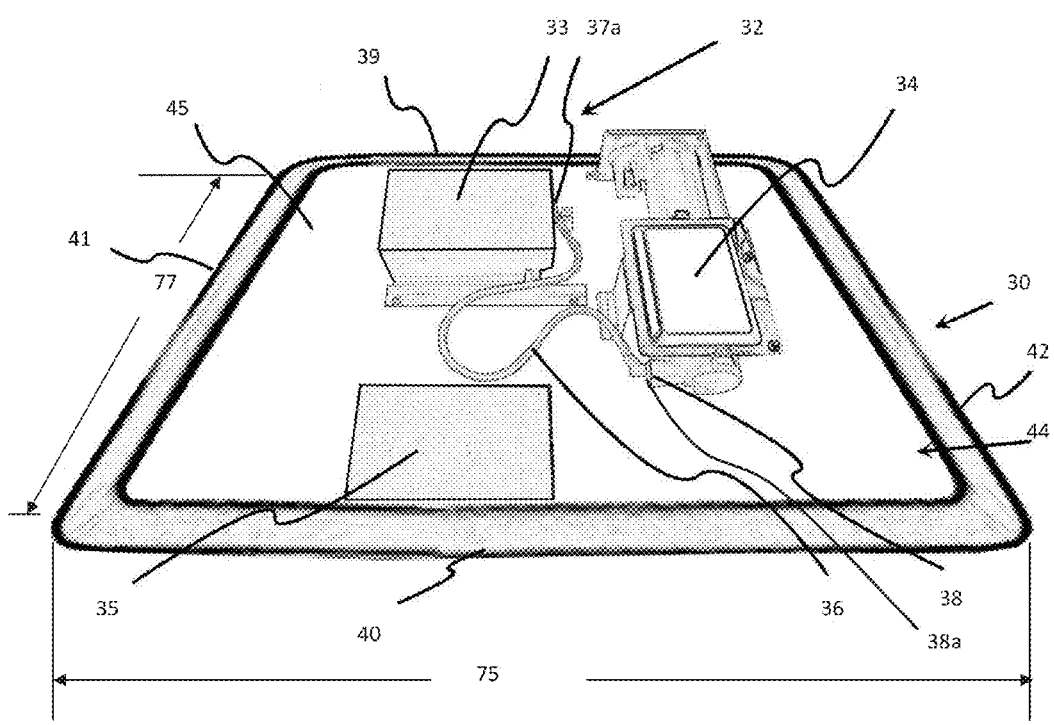
FIG. 2 shows a top perspective view of an embodiment of a water line tube fluidically connected between the first component and the second component in the machine compartment.

Referring to FIG. 1B and FIG. 2, the machine compartment 30 comprises at least a first component 33, a second component 34, a third component 35, and a tube 36 fluidically connected between the first component 33 and the second component 34. The first component 33 may have a fluid connection port 37. The second component 34 may have a fluid connection port 38. The tube 36 is at least in part elastically rigid.

Referring again to FIG. 1B and FIG. 2, the machine compartment 30 may have a compartment front 39, a compartment back 40, a compartment first side 41, a compartment second side 42, a compartment top 43, a compartment interior 44, and a compartment bottom 45. The machine compartment 30 may be the same dimensions as the appliance exterior 22 or may be larger or smaller than the appliance exterior 22. The machine compartment 30 may be disposed near the bottom 29 of the appliance 20, although it is contemplated that the machine compartment 30 could be positioned outside, below, adjacent, near the top 28, or elsewhere inside the appliance 20 or partially inside the appliance 20. The machine compartment 30 may be at least partially accessible from at least one of the compartment front 39, the compartment back 40, the compartment first side 41, the compartment second side 42, the compartment top 43, the compartment interior 44, or the compartment bottom 45 of the machine compartment 30 or at least partially accessible from at least one of the front 24, the back 25, the first side 26, the second side 27, the top 28, the appliance interior 21, or the bottom 29 of the appliance 20. At least one of the first component 33, the second component 34, and the tube 36 may be at least partially accessible from the at least one machine compartment opening 32 to the machine compartment 30.

Referring again to FIG. 1A, the appliance 20 may include a refrigerator, a freezer, an oven, a washing machine, a dryer, a dishwasher, or a built in appliance. The appliance exterior 22 may comprise a cabinet, a casing, or may be an appliance 20 without an exterior cabinet, such as a built in dishwasher. The appliance access 23 may be a door, a drawer, a partition, an opening, a panel, or an unenclosed portion of the appliance 20. The water line tube 36 may also transport a fluid other than water or transport a gas.

At least one of the first component 33 and the second component 34 may optionally be a water filter housing, a water valve, a pump, a valve, a compressor, a connection to another fluid line, a diverter valve, a splitter, an ice maker, or a dispenser.

Figure 3:
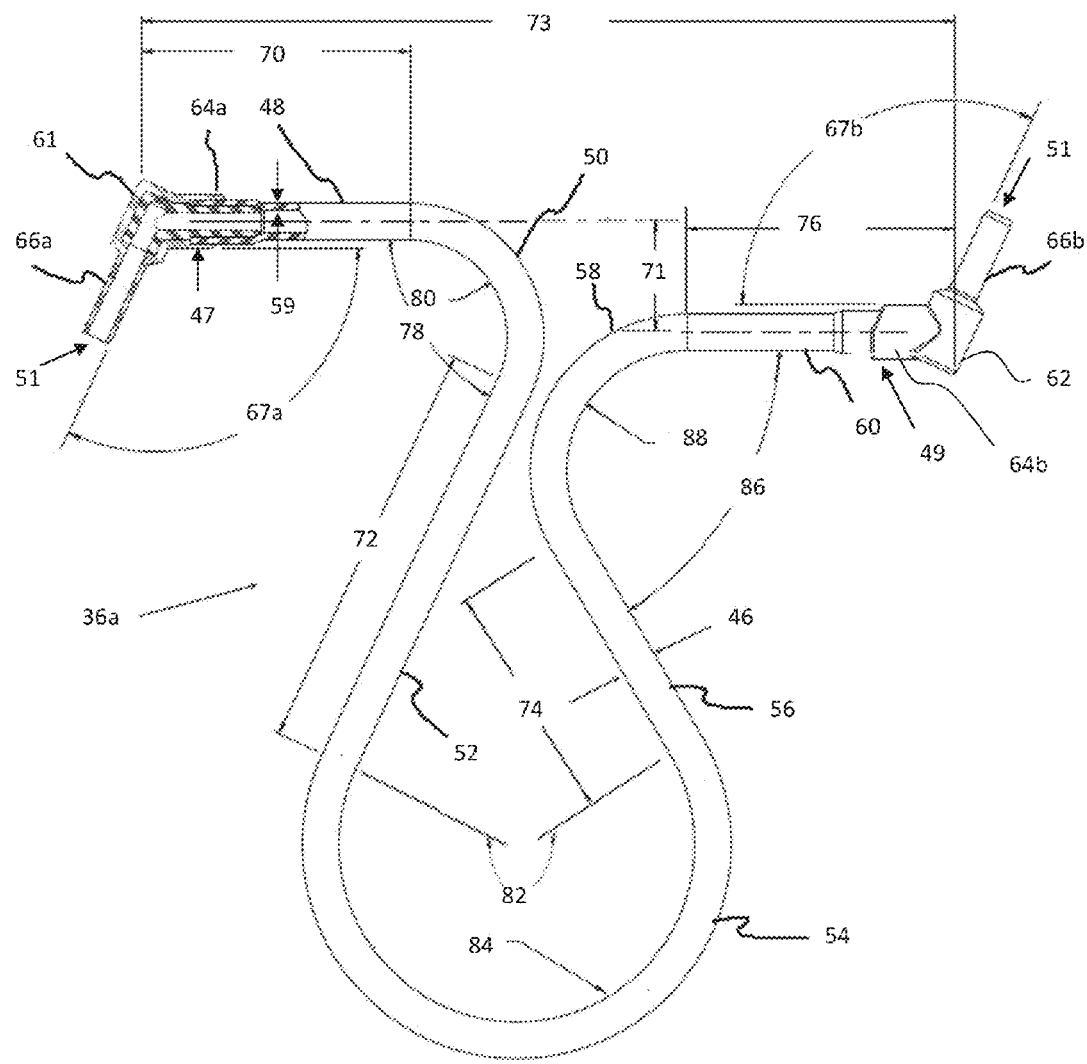
FIG. 3 shows a top perspective view of an embodiment of a water line tube removed from the appliance.

An exemplary embodiment of an unconstrained tube 36a removed from the appliance 20 is shown in FIG. 3. The tube 36a comprises at least a tube outer diameter 46, a first tube end 47, a second tube end 49, and a passage 51 there through to carry a fluid. The tube 36a further comprises a first substantially straight section 48 adjacent the first tube end 47, a first formed bend 50 adjacent the first substantially straight section 48, a second substantially straight section 52 adjacent the first formed bend 50, a second formed bend 54 adjacent the second substantially straight section 52, a third substantially straight section 56 adjacent the second formed bend 54, a third formed bend 58 adjacent the third substantially straight section 56, a fourth substantially straight section 60 adjacent the third formed bend 58 and adjacent the second tube end 49. The tube 36a is formed at least in part from an elastically rigid material.

Referring again to FIG. 3, the tube 36a may further optionally have a first connector 61 attached to the first tube end 47. The tube 36a may optionally have a second connector 62 attached to the second tube end 49. At least one of the first connector 61 and the second connector 62 may be attached to the respective tube ends 47, 49 by means of at least one of an overmold, an insert mold, a crimped attachment, a hot melt, a threaded attachment, a press fit attachment, a clamped connection, a wedge connection, a glued connection, or may be formed or molded as one piece with the tube. At least one of the first connector 61 or the second connector 62 may optionally comprise a connector substantially straight section 64a, 64b attached onto the respective tube end 47, 49 in multiple optional configurations and may further optionally comprise a nozzle section 66a, 66b. Said nozzle section 66a, 66b may be formed at a nozzle angle 67a, 67b to the connector substantially straight section 64a, 64b or may be formed oriented in line with the connector substantially straight section 64a, 64b. The first connector 61 and the second connector 62 may optionally be formed out of the same material as the tube 36a, out of a different material or materials than the tube 36a, and optionally each connector 61, 62 may be formed out of different materials.

Referring again to FIG. 3, the first substantially straight section 48 has an approximate first length 70. The second substantially straight section 52 has an approximate second length 72. The third substantially straight section 56 has an approximate third length 74. The fourth substantially straight section 60 has an approximate fourth length 76. The first formed bend 50 has an approximate first bend angle 78 and an approximate first bend radius 80. The second formed bend 54 has an approximate second bend angle 82 and an approximate second bend radius 84. The third formed bend 58 has an approximate third bend angle 86 and an approximate third bend radius 88.

Referring again to FIG. 3, the first substantially straight section 48 may optionally be oriented parallel to the fourth substantially straight section 60 and may optionally have an offset distance 71. The connectors 61, 62 may be separated by a connector distance 73.

Figure 4:
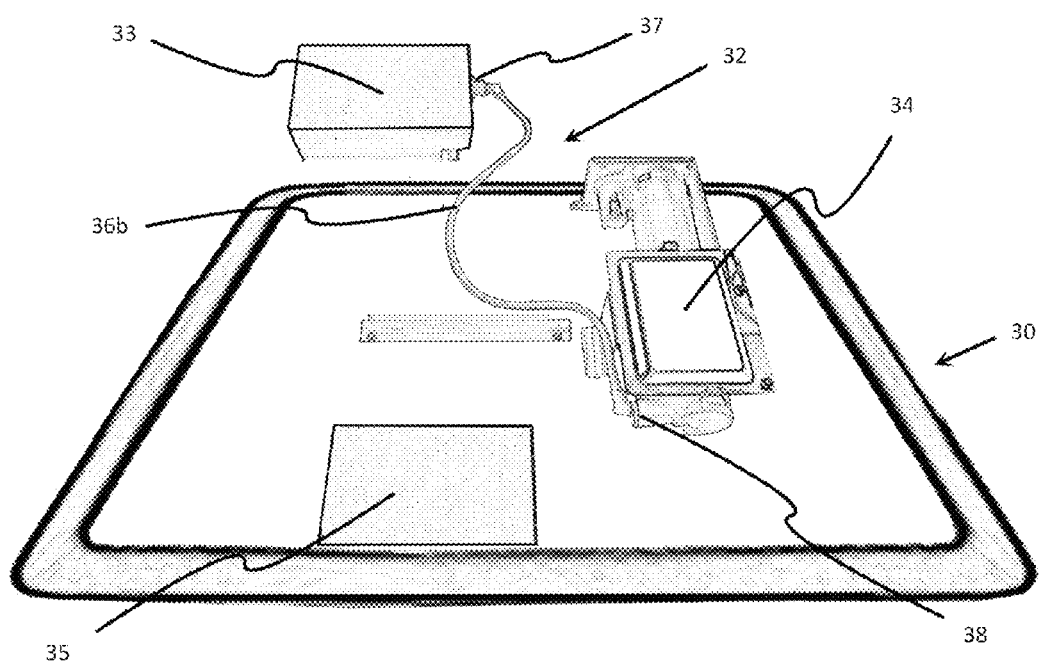
FIG. 4 shows a top perspective view of an embodiment of the first component removed from the machine compartment while the water line tube is fluidically connected to the first component and the second component.

An exemplary view is shown in FIG. 4 of the first component 33 removed from the machine compartment 30 through the at least one machine compartment opening 32 while the second component 34 is still in the machine compartment 30 and the tube 36b is still fluidically connected between the first component 33 and the second component 34.

An example of one embodiment is shown in FIG. 3. At least one desired range of motion and position of components 33, 34, 35 in a machine compartment 30 is shown in FIG. 2 and FIG. 4. Referring to FIG. 2, the tube 36 is retracted into the machine compartment 30. The tube 36 does not unacceptably contact the sides of the first component 33, the second component 34, or the third component 35. The fluid connections 37a, 38a between the tube 36 and the first component 33 and the second component 34 do not appear to have unacceptable stress. Referring to FIG. 4, the first component 33 has been removed from the machine compartment 30 while the tube 36b is still fluidically connected 37a to the first component 33 and fluidically connected 38a to the second component 34. The contour 90 (see FIG. 5) of the tube 36 has changed to the contour 92 (see FIG. 5) of the tube 36b. The tube 36 has extended to the position of tube 36b while still maintaining acceptable stress on the fluid connections 37a, 38a and while avoiding unacceptable amount of contact with the components 33, 34, 35 in the machine compartment 30.

Referring again to FIG. 3, an example of an embodiment may have a tube outer diameter 46 of about 7.94 mm with a tube wall thickness 59 of about 1.42 mm. The tube 36a may be formed out of a cross-linked polyethylene (PEX) such as MERFLEX PEX OT® from Mercury Plastics. The minimum bend radius of MERFLEX PEX OT® with a tube outer diameter 46 of about 7.94 mm is about 63.5 mm and has a minimum bend radius of a substantially straight section of tube of about 8 times the tube outer diameter.

The connectors 61 and 62 may be formed at least in part from a nylon polyamide 66 such as Dupont Zytel® 101 NC010. The first connector 61 nozzle angle 67a is about 115 degrees. The second connector 62 nozzle angle 67b is about 115 degrees. The length of the nozzle 66a is about 35.5 mm. The length of the nozzle 66b is about 35.5 mm. The connectors 61, 62 and the tube 36a as shown in FIG. 3 include both insert molded and overmolded surfaces. The length of each of the connector straight sections 64a, 64b is about 18.1 mm.

The length 70 of the first substantially straight section 48 is about 58.3 mm. The first bend angle 78 is about 65 degrees. The first bend radius 80 is about 25 mm. The length 72 of the second substantially straight section 52 is about 90 mm. The length 76 of the fourth substantially straight section 60 is about 58 mm. The third formed bend 58 has an third bend angle 86 of about 60 degrees and a bend radius 88 of about 26 mm. The overall length 73 between the first connector 61 and the second connector 62 is about 176.3 mm. The offset 71 between the first substantially straight section 48 and the fourth substantially straight section 60 is about 24 mm.

The second formed bend 54 has a bend radius 84 of about 39 mm and a bend angle 82 of about 305 degrees. The length 74 of the third substantially straight section 56 is about 52 mm.

Other dimensions can be used provided that the tube remains elastically rigid.

Figure 5:
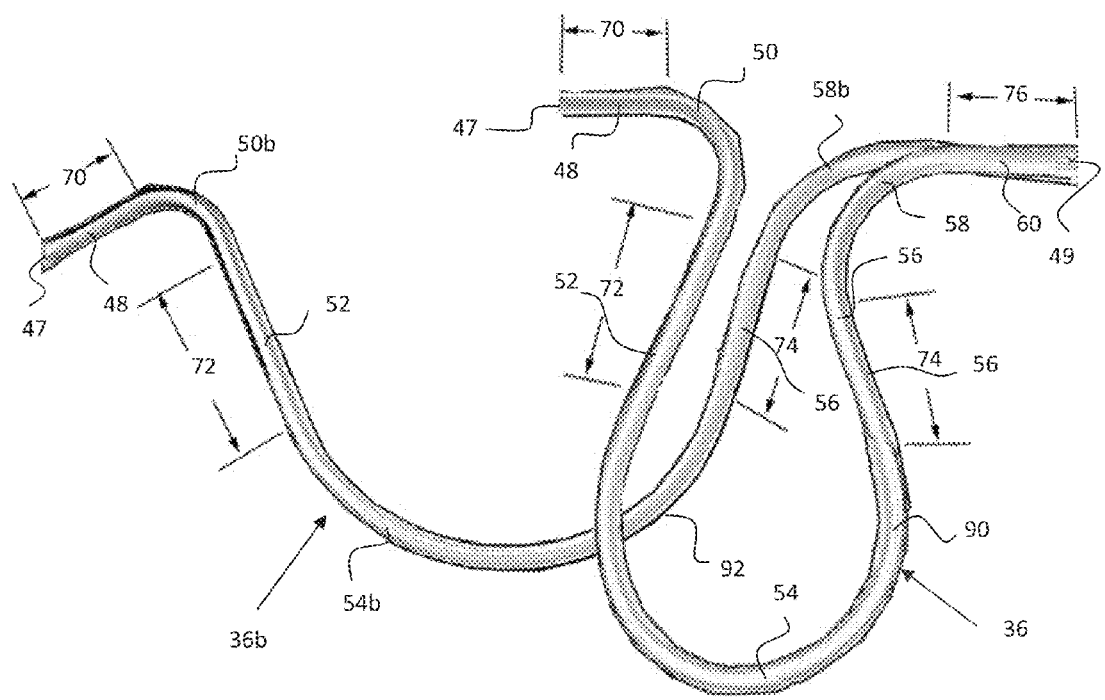
FIG. 5 shows a top perspective view of an embodiment of the water line tube in an extended position and a retracted position.

An exemplary view is shown in FIG. 5 of a retracted contour 90 of the tube 36 when the first component 33 is located within the machine compartment 30 (see FIG. 2) and of the extended contour 92 of the tube 36b when the first component 33 is repositioned outside of the machine compartment 30 (see FIG. 4). The retracted contour 90 and the extended contour 92 are shown aligned at the second tube end 49. An exemplary view is shown in FIG. 6 of the retracted contour 90 and the extended contour 92 aligned along the outer radius of the second formed bend 54.

Figure 6:
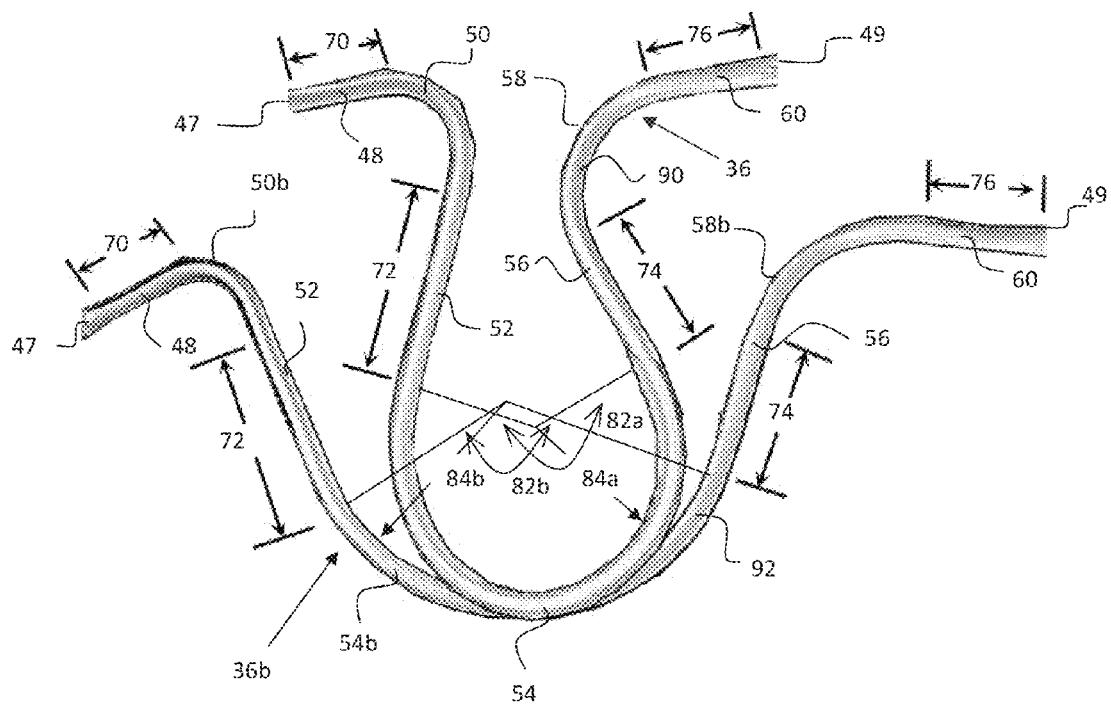
FIG. 6 shows a top perspective view of an embodiment of the water line tube in a retracted position and in an extended position so that the second formed bends are aligned.

Referring to FIG. 5 and FIG. 6, the change in contour from the retracted contour 90 to the extended contour 92 occurs substantially in at least one of a change in bend angle and a change in bend radius of at least one of the first formed bend 50, 50b, the second formed bend 54, 54b, and the third formed bend 58, 58b. In both the retracted contour 90 and the extended contour 92, the approximate length 70, 72, 74, 76 of each of the substantially straight sections 48, 52, 56, 60 remains substantially unchanged. In this embodiment the tube 36 is elastically rigid.

The tube 36 can be at least partially formed out of a resin material. Examples of suitable resin materials are the group comprising high density polyethylene, cross-linked polyethylene (PEX), pre-formed PEX tubing, polyacetals, poly(meth)acrylics, polyarylether ketones, polyether ketones, polyacrylonitrile resins, polyamides, polyamide-imides, polyacrylates, polybutene resins, polycarbonates, polyalkylene terephthalates, polyetherimides, polyethylene homopolymers, polyethylene copolymers, polypropylene homopolymers, polypropylene copolymers, ethylene acid copolymers, ethylene-vinyl acetate copolymers, ethylene-vinyl alcohol copolymers, polyimides, polyphenylene oxides, polyphenylene sulfides, acrylonitrile butadiene styrene terpolymers, polystyrenes, styrene-acrylonitrile copolymers, styrene-butadiene copolymers, styrene maleic anhydride copolymers, polyarylsulfones; polyethersulfones; polysulfones, thermoplastic styrenic block copolymers, thermoplastic polyolefin blends, thermoplastic elastomeric alloys, thermoplastic polyurethanes, thermoplastic copolyesters, thermoplastic polyamides, polyvinyl chlorides, chlorinated polyvinyl chlorides, polyvinylidene chlorides, allyl thermosets of allyl esters, bismaleimides, epoxy resins, phenolic resins, unsaturated thermoset polyesters, thermoset polyimides, polyurethanes, urea and melamine formaldehyde resins, and similar materials.

The ends 47, 49 of the tube 36, or the connectors 61, 62, or portions of the tube 36 may be formed out of a single material, or optionally out of a different material or materials.

Referring again to FIG. 3, at least one of the ends 47, 49 of the tube 36a may optionally have a connector 61, 62. The at least one of the ends 47, 49 of the tube 36a may alternately not have a distinct connector other than the ends of at least one of the first, the third, or the fourth substantially straight sections 48, 52, 60 (see FIG. 5).

Referring again to FIG. 3, at least one of the optional connectors 61, 62 may optionally comprise a substantially straight connector section 64a, 64b attached to at least one end 47, 49 of the tube 36a. The substantially straight connector section 64a, 64b may be formed oriented in line with the substantially straight section 48, 60 of tube 36a near the tube end 47, 49 or optionally may be oriented at an angle (not shown) to the substantially straight section 48, 60 of the tube 36 near the tube end 47,49.

Referring again to FIG. 3, at least one of the connectors 61, 62 may optionally comprise a nozzle section 66a, 66b. The nozzle section 66a, 66b, alternately referred to as a nozzle 66a, 66b, may be formed with an orientation substantially in line with the substantially straight connector section 64a, 64b or may be formed with an orientation at an angle 67a, 67b to the substantially straight connector section 64a, 64b. The optional angle 67a, 67b between the nozzle 66a, 66b and the substantially straight connector section 64a, 64b, alternately referred to as a nozzle angle 67a, 67b, may be between about 90 degrees to about 180 degrees inclusive, or optionally between about 180 degrees to about 270 degrees inclusive, or about 93 degrees to about 170 degrees inclusive, or about 110 degrees to about 150 degrees inclusive, or about 190 degrees to about 250 degrees inclusive, or about 210 degrees to about 246 degrees inclusive.

Referring again to FIG. 3, if the ends 47, 49 of the tube 36a have at least one of the optional connector 61, 62, the connector 61, 62 may be formed out of a single material, optionally out of multiple materials, optionally with an overmolded component, optionally with an insert molded component, optionally with a combination of overmolded and insert molded components, or the like. The at least one of the connectors 61, 62 may optionally be formed out of the same material as the tube 36a, optionally out of a different resin material from the same group as the example materials for the tube 36a, or optionally of a different material such as a thermoplastic elastomeric vulcanizate such as Santoprene®, nylon such as Zytel®, metal, or optionally out of multiple materials.

Referring to FIG. 2, at least one of the fluid connections 37a, 38a between the tube 36 and at least one of the components 33, 34 may be a compression fit connection, a clamped connection, a threaded connection, a glued connection, a slip fit connection, a press fit connection, a wedge connection, or a hot melt connection.

Referring again to FIG. 3, the entire tube 36a, at least one substantially straight section 48, 52, 56, 60, or at least one substantially arcuate formed bend section 50, 54, 58 may have the same tube outer diameter 46, a different tube outer diameter, or a gradient of tube outer diameters. The tube outer diameter 46 may be substantially consistent from one end 47 of the tube to the other end 49 of the tube 36a or may change based on the location within the tube 36a. The tube outer diameter 46 is substantially about 5 mm to about 12 mm inclusive, or optionally about 6 mm to about 10 mm inclusive, optionally about 6.2 mm to about 9 mm inclusive, or optionally about 6.5 mm to about 8.8 mm inclusive.

Referring again to FIG. 3, the entire tube 36a, at least one substantially straight section 48, 52, 56, 60, or at least one substantially arcuate formed bend section 50, 54, 58 may have the same tube wall thickness 59, a different tube wall thickness, or a gradient of tube wall thicknesses. The tube wall thickness 59 may be substantially consistent from the first tube end 47 to the second tube end 49 or may change based on the location within the tube 36a. The tube wall thickness 59 is substantially about 0.5 mm to about 5 mm inclusive, or optionally about 1 mm to about 3 mm inclusive, or optionally about 1.2 mm to about 2.3 mm inclusive.

Referring again to FIG. 3, the tube 36a may optionally have at least one of an inner liner and an outer liner (not shown). The tube 36a may optionally comprise a layered structure of at least two layers over at least a portion of the tube (not shown). The tube 36a may optionally comprise different amount of layers in at least two sections of the tube (not shown).

Referring again to FIGS. 2 and 3, at least one of the first, the second, the third, and the fourth substantially straight sections 48, 52, 56, 60 may have a length 70, 72, 74, 76 of at least two times said section's tube outer diameter 46. Each of the substantially straight sections 48, 52, 56, 60 may have a length 70, 72, 74, 76 up to the maximum length of the largest of the compartment width 75, compartment length 77, or compartment depth (not shown) of the machine compartment 30.

Referring again to FIG. 3, the unconstrained bend angle 78, 86 of at least one of the first formed bend 50 and the third formed bend 58 may be less than about 270 degrees, optionally less than about 180 degrees, optionally less than about 90 degrees, optionally between about 85 degrees to about 50 degrees inclusive, or optionally less than about 45 degrees. At least one of the first formed bend 50 or the third formed bend 58 may optionally have an unconstrained bend angle 78, 86 of substantially 180 degrees. In the embodiment illustrated in FIG. 15, one of the arcuate formed bends 50, 58 from FIG. 3 along with substantially straight sections (FIG. 3, 48, 52 or 56, 60) on either side of said arcuate formed bend 50, 58 have been replaced by a combined substantially straight section 79 of the tube.

Referring again to FIG. 3, the unconstrained bend angle 78, 86 of the first formed bend 50 and the third formed bend 58 may be substantially about the same amount of bend angle or may be of substantially different amount of bend angles.

Referring again to FIG. 3, the unconstrained bend radius 84 of the second formed bend 54 may be optionally greater than about 45 degrees, optionally greater than about 90 degrees, optionally greater than about 135 degrees, optionally greater than about 180 degrees, optionally greater than about 270 degrees, or optionally greater than about 360 degrees.

Referring again to FIG. 3, the unconstrained bend radius 80, 84, 88 of at least one of the first, the second, or the third formed bends 50, 54, 58 may have substantially a consistent bend radius throughout that specific formed bend 50, 54, 58 or optionally may have a varying bend radius at different positions in that specific formed bend 50, 54, 58. The center points of the optionally varying bend radii of a specific formed bend may align at substantially the same position or may optionally have center points with different positions with respect to the unconstrained tube 36a.

Referring again to FIG. 3, the unconstrained bend radius 80, 88 of at least one of the first formed bend 50 and the third formed bend 58 has a bend radius of about 1 to about 8 inclusive times the tube outer diameter 46 of the respective bend 50, 58, or optionally a bend radius of about 2 to about 6 inclusive times the tube outer diameter 46 of the respective bend 50, 58, or optionally about 2.5 to about 5 inclusive times the tube outer diameter 46 of the respective bend 50, 58, optionally about 3 to about 4.5 inclusive times the tube outer diameter 46 of the respective bend 50, 58, or optionally about 3.2 to about 4.3 inclusive times the tube outer diameter 46 of the respective bend 50, 58.

Referring again to FIG. 3, the unconstrained bend radius 84 of the second formed bend 54 has a bend radius of about 2 to about 10 inclusive times the tube outer diameter 46 of the second formed bend 54, optionally a bend radius of about 3 to about 9 inclusive times the tube outer diameter 46 of the second formed bend 54, optionally about 4 to about 8 inclusive times the tube outer diameter 46 of the second formed bend 54, optionally about 4.3 to about 7.5 inclusive times the tube outer diameter 46 of the second formed bend 54, or optionally about 4.8 to about 7 inclusive times the tube outer diameter 46 of the second formed bend 54.

Referring again to FIG. 3, the tube 36a has a minimum allowed bend radius of a straight section of tube between about 3 to about 12 inclusive times the tube outer diameter 46, optionally between about 4 to about 11 inclusive times the tube outer diameter 46, optionally between about 5 to about 10 inclusive times the tube outer diameter 46, optionally between about 6 to about 9 inclusive times the tube outer diameter 46, or optionally between about 5 to about 8 inclusive times the tube outer diameter 46.

Referring again to FIG. 3, at least one of the first formed bend 50 and the third formed bend 58 has an unconstrained bend angle 78, 86 of less than about 270 degrees, optionally less than about 170 degrees, optionally less than about 150 degrees, optionally less than about 120 degrees, optionally less than about 90 degrees, optionally less than about 70 degrees, optionally less than about 50 degrees, or optionally less than about 35 degrees.

Referring again to FIG. 3, the second formed bend 54 has an unconstrained bend angle 82 greater than about 150 degrees, optionally greater than about 180 degrees, optionally greater than about 190 degrees and less than about 250 degrees, optionally greater than about 220 degrees and less than about 290 degrees, optionally greater than about 260 degrees and less than about 300 degrees, optionally greater than about 270 degrees and less than about 330 degrees, optionally greater than about 300 degrees, optionally greater than about 330 degrees, or optionally greater than about 360 degrees.

Referring again to FIG. 1B, there may be insufficient room in the machine compartment 30 to bend a substantially straight section of elastically rigid tube 36 with a minimum recommended bend radius of between about 3 to about 12 inclusive times the tube outer diameter and maintain a bend radius greater than the minimum recommended bend radius. Additional length is needed in the tube 36 to allow at least one of the two components 33, 34 to be at least partially removed from the machine compartment 30. The additional length of tube has to fit in the machine compartment 30 without causing unacceptable stress on the tube 36 or at the fluid connections 37*a*, 38*a*.

Referring again to FIG. 3, the elastic property of a formed bend 50, 54, 58 of the tube 36*a* is used to allow the contour of an essentially rigid tube to be adjusted to allow the at least partial removal of at least one component 33, 34 from the machine compartment 30. The arcuate bend angle 78, 82, 86 can be increased or decreased when a force is applied to the formed bend 50, 54, 58. The amount that a formed bend 50, 54, 58 will increase or decrease in at least one of a bend angle and bend radius without resulting in unacceptable stress is dependent on the tube material, the inner radius of the unconstrained formed bend 50, 54, 58, the arcuate unconstrained bend angle 78, 82, 86, the tube outer diameter 46, and the tube wall thickness 59. For a given material, tube outer diameter 46, and tube wall thickness 59, the amount of elasticity of the formed bend 50, 54, 58 increases as the unconstrained bend angle 78, 82, 86 increases.

Referring again to FIG. 3, when the unconstrained bend angle 78, 82, 86 is below about 150 degrees, optionally below 90 degrees, or optionally between about 45 degrees and about 80 degrees, the elasticity of the formed bend 50, 54, 58 is substantially in the plane of the unconstrained formed bend 50, 54, 58.

Referring again to FIG. 3, substantially straight sections 48, 52, 56, 60 of the tube 36*a* on either side of the formed bend 50, 54, 58 may act as lever arms to apply a load to the formed bend 50, 54, 58.

Referring again to FIG. 3, when the unconstrained bend angle 78, 82, 86 is above about 150 degrees, optionally above about 180 degrees, optionally above 220 degrees, or optionally between about 210 degrees and about 330 degrees, the elasticity of the formed bend 50, 54, 58 permits adjustment in the plane of the unconstrained formed bend 50, 54, 58 and in the plane perpendicular to the unconstrained formed bend 50, 54, 58. Additional length of substantially straight sections 48, 52, 56, 60 of the tube 36*a* may be needed on at least one side of the formed bend 50, 54, 58 to act as a lever arm to apply a load to the formed bend 50, 54, 58 to move the formed bend 50, 54, 58 out of the unconstrained formed bend plane.

Referring again to FIG. 3, the substantially straight sections 48, 52, 56, 60 act as links and the formed bends 50, 54, 58 act as pivot points. The sequence of substantially straight sections 48, 52, 56, 60 alternating with formed bends 50, 54, 58 acts as a linkage between the substantially straight sections 48, 52, 56, 60. This linkage can be moved through motions related to the position, orientation, and size of the various components in the linkage. By considering the probable locations of the connection ports 37, 38 of the first component 33 and the second component 34 in the machine compartment 30, the combination of straight sections 48, 52, 56, 60 and formed bends 50, 54, 58 can be adjusted to allow for repositioning the components 33, 34 without applying unacceptable stress to the tube 36*a* or to the connections 37*a*, 38*a*.

Figure 9:
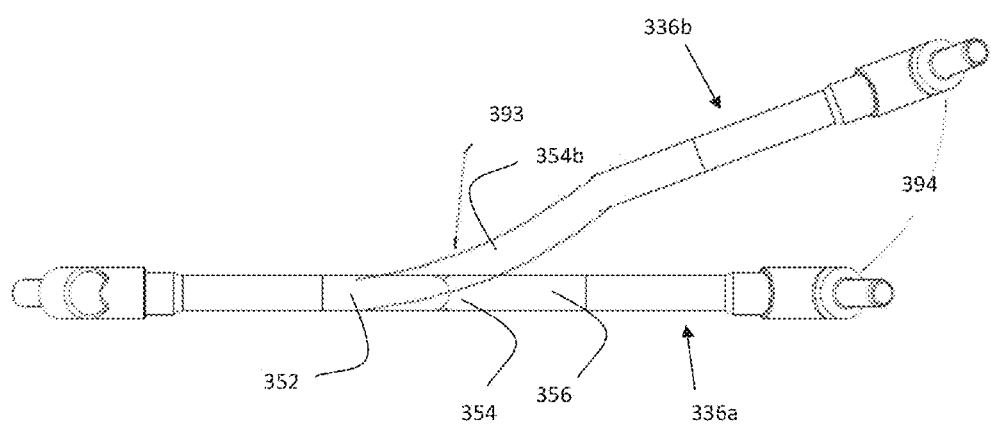
FIG. 9 shows a front perspective view of an embodiment of the water line tube in an unconstrained position and with a side load applied perpendicular to the plane of the second formed bend.

Referring to FIGS. 3 and 9, the formed bend 50, 54, 58 may be adjusted in the plane of the unconstrained formed bend 50, 54, 58 or off the plane of the unconstrained formed bend 50, 54, 58. As at least one of the unconstrained bend angle 78, 82, 86 and the unconstrained bend radius 80, 84, 88 becomes larger, the amount the formed bend 50, 54, 58 will bend out of the unconstrained formed bend plane will increase. The amount of force applied to the formed bend 50, 54, 58, the orientation of the applied force, the minimum recommended bend radius of the material as formed, the unconstrained bend radius 80, 84, 88 of the formed bend 50, 54, 58, and the unconstrained bend angle 78, 82, 86 of the formed bend 50, 54, 58 may affect the amount of out of plane bend that can be obtained.

Referring to FIGS. 2, 3, and 4, when one component 33, 34 is being repositioned while the tube 36 is still connected to both components 33, 34, the tube end 49 attached to the second component 34 is constrained. Repositioning the first component 33, or repositioning the tube 36 when the tube 36 is no longer attached to the first component 33 and is still attached to the second component 34, applies a force to the tube 36. This force is propagated along the tube 36 and is distributed into the formed bends 50, 54, 58. At least one of the bend radius 80, 84, 88 and the bend angle 78, 82, 86 of at least one of the formed bends 50, 54, 58 adjusts in response to the applied load. The elastically rigid properties of the formed bends 50, 54, 58 allow the formed bends 50, 54, 58 to act as pivot points between the adjacent substantially straight sections 48, 52, 56, 60.

Referring to FIG. 3, the tube 36*a* with the first substantially straight section 48 adjacent the first formed bend 50 adjacent the second substantially straight section 52 adjacent the second formed bend 54 adjacent the third substantially straight section 56 adjacent the third formed bend 58 adjacent the fourth substantially straight section 60 acts like a linkage with four links and three pivot points.

Figure 15:
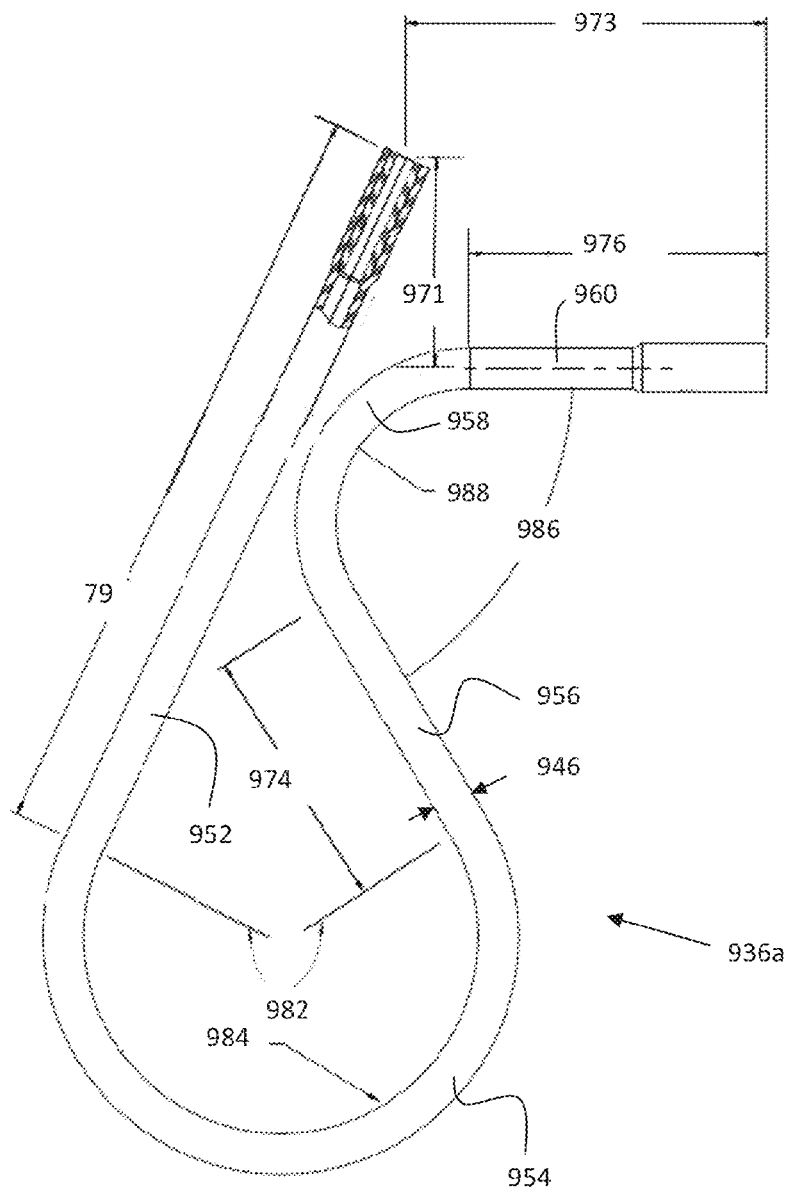
FIG. 15 shows a top view of another embodiment of the water line tube.

FIG. 15 illustrates another embodiment of the invention. A tube 936*a* with a first substantially straight section 952 adjacent a first formed bend 954 adjacent a second substantially straight section 956 adjacent a second formed bend 958 adjacent a third substantially straight section 960 acts like a linkage with three links and two pivot points.

Referring again to FIGS. 2 and 3, when the tube 36*a* has a connector 61, 62 on at least one end 47, 49 and the connector 61, 62 further has a nozzle 66*a*, 66*b* that is formed at an angle 67*a*, 67*b* to the adjacent straight section 48, 60 of tube 36*a*, the nozzle 66*a*, 66*b* and the adjacent straight section 48, 60 act like a "bent" link. Also, when the tube 36*a* is connected to at least one component 33, 34, the connection 37*a*, 38*a* between the tube end 47, 49, or optionally the connector 61, 62, and the component 33, 34 acts as an additional pivot point. The component 33, 34 itself may act as an additional link in the linkage.

The length and shape of each link changes the trajectory of the motion of the linkage. The unconstrained bend radius, the unconstrained bend angle of each of the formed bends, and the "force-to-bend" affects the amount of motion that a specific formed bend may move through and the force that is needed to move that formed bend. The amount of out of plane motion is related to the unconstrained bend angle in the unconstrained plane, the unconstrained bend radius in the unconstrained plane, the "force-to-bend", and the force components applied to the formed bend.

The applied force component in the out of plane direction acts on the formed bend and may be sufficient to cause the formed bend to arc out of the unconstrained plane and act as a constrained ball pivot. The amount of arcing out-of-plane is related to the unconstrained arc length, the minimum recommended bend radius of a straight section of tube, the "force-to-bend", and the force component in the out-of-plane direction. The out-of-plane minimum recommended bend radius may be different than the in-plane recommended bend radius for the formed bend and may be different than the in-plane recommended bend radius for a straight section of tube.

The "force-to-bend" a straight section of tube may be different than the "force-to-bend" a formed bend in the plane of the unconstrained formed bend and may be different than the "force-to-bend" a formed bend in a plane other than the unconstrained plane of the formed bend. As the angle between the unconstrained plane of the formed bend and the desired plane of the out-of-plane bend increases, the "force-to-bend" may also change. The "force-to-bend" may be nonlinear with respect to the amount of angular bend of a section of tube.

Referring again to FIGS. 1B, 2, 3, and 4, and considering the likely motions of the first component 33, the second component 34, the tube 36 as it moves through the machine compartment 30, and the positions of any other components 35 in the machine compartment 30, a preferred range of motion may be envisioned. Adjusting at least one of the lengths 70, 72, 74, 76 of the individual substantially straight sections 48, 52, 56, 60, optionally at least one of the bend angle 78, 82, 86 and bend radius 80, 84, 88 of the unconstrained formed bends 50, 54, 58, and optionally the "force-to-bend", which may be related to at least one of the tube outer diameter 46, the tube wall thickness 59, and the material used to form the respective tube segment, various linkage trajectories may be obtained.

An example of determining linkage configurations in general is shown in "FUNdaMENTALS of DESIGN, Topic 4, Linkages" © 2008 by Alexander Slocum, published by Center for Integration of Medicine & Innovative Technology and Massachusetts Institute of Technology at http://web.mit.edu/2.75/resources/FUNdaMENTALS.html, and is incorporated herein by reference. Linkages herein are found where the combination of substantially straight sections and the pivots substantially act as linkages.

Referring again to FIG. 2, by treating a water line tube 36 as a linkage, the desired range of motion can be obtained while minimizing the stress on the connection points 37a, 38a.

A flexible tube will not act as a linkage because a flexible tube does not have any substantially rigid sections along with discrete pivot points. The range of motion of a flexible tube in empty space is essentially a sphere with a radius of the tube length. The motion of the flexible tube cannot be controlled to avoid objects or to reduce the load on the connection points.

An essentially rigid tube will have a fixed trajectory in empty space. The stress at the connection points cannot be minimized. The motion of a rigid tube cannot be adjusted to avoid objects in the environment.

A substantially straight section of elastically rigid tube may bend in a large arc where the arc length is the length of the substantially straight section of the tube. This produces a somewhat different possible motion of the tube than for a rigid tube. However, the motion of the tube is not controlled enough to avoid objects in the environment or to reduce the load on the connections.

When a sequence of substantially straight sections is used with formed bends between the substantially straight sections, the tube will act like a mechanical linkage. The formed bends become constrained pivot points with a motion in space related to the design of the formed bend. The pivots have a restriction on the amount of swing at the pivot.

Since the substantially straight sections are for the most part unconstrained, the substantially straight sections act as substantially rigid links. By using the properties of the alternating sequence of substantially straight sections and formed bends, and considering linkage design principles, a tube contour can be determined that allows for the desired motion at the tube ends while minimizing the stress applied at the connections and allowing a trajectory of motion of the tube avoiding other objects in the environment.

The same principles allowing for the motion of the tube as a linkage also allows a single tube contour to be used for multiple component locations as well as being tolerant to positional changes in the fluid connection locations. The desired amount of movement of the possible connection locations, as well as the possible locations of the other objects in the machine compartment can be considered when determining a desired tube contour.

Figure 7:
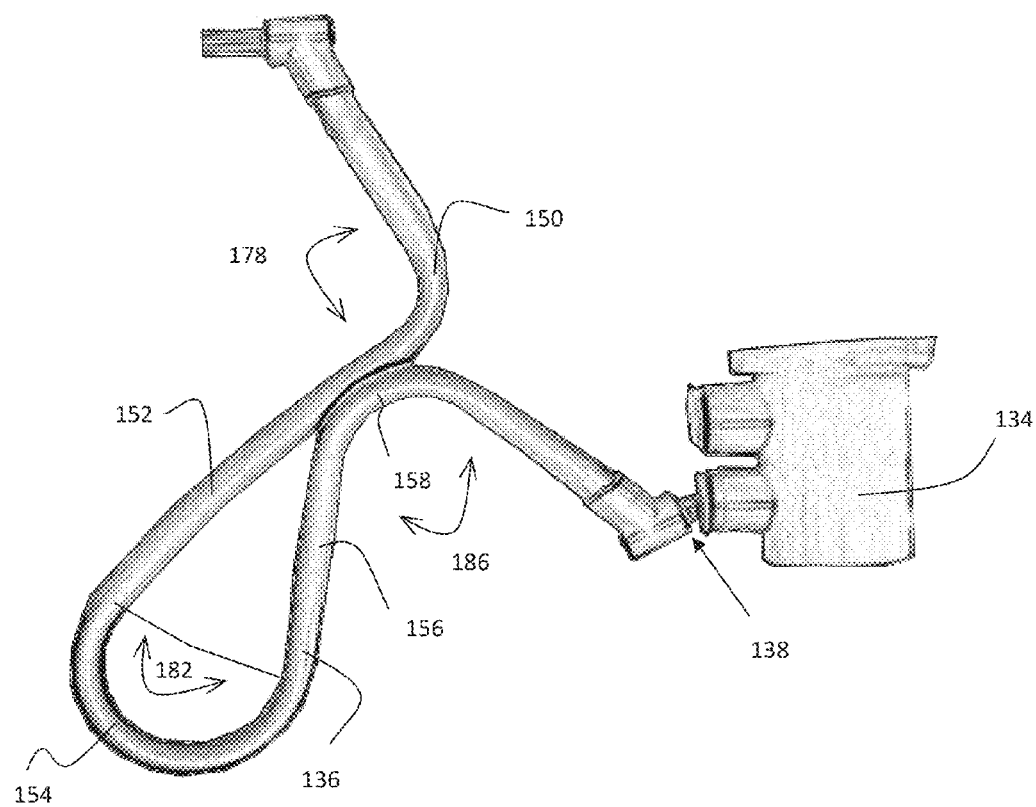
FIG. 7 shows a top perspective view of an embodiment of a retracted water line tube fluidically connected to the second component with unacceptable stress on the connection.
Figure 8:
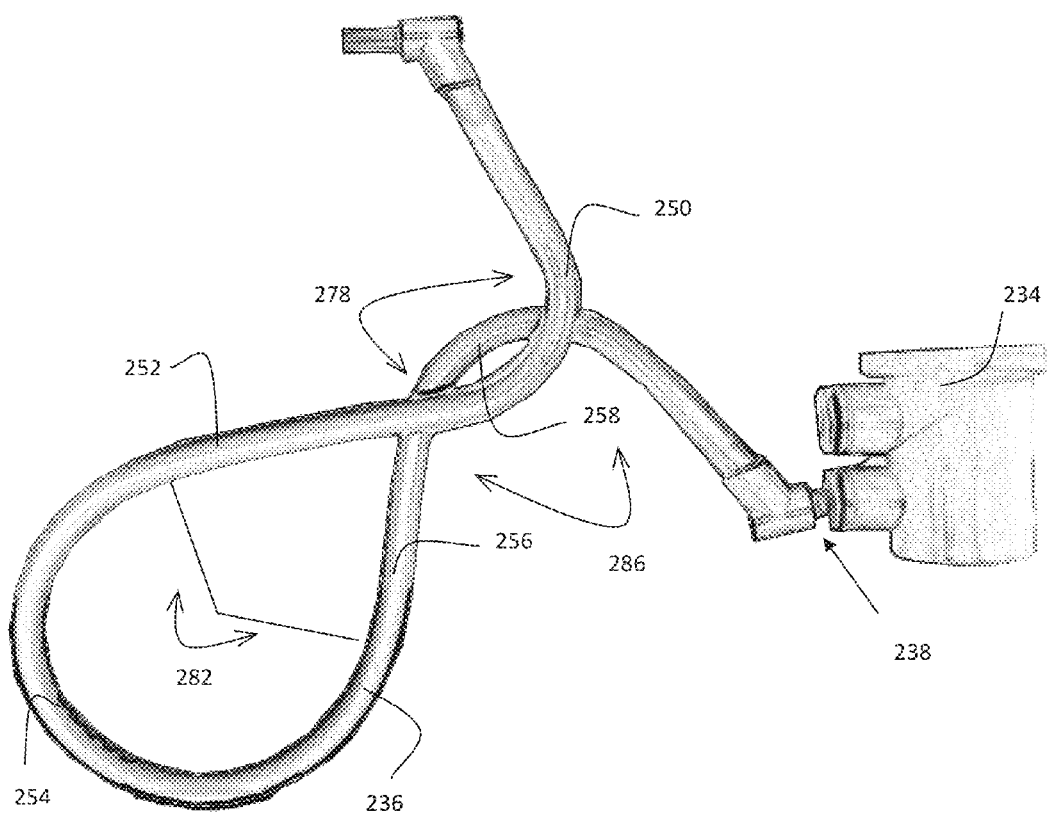
FIG. 8 shows a top perspective view of an embodiment of the water line tube fluidically connected to the second component with less stress on the connection in a retracted position.

Referring to FIGS. 7 and 8, the effect of changing the bend radii and bend angles are demonstrated. In FIG. 7, the fluid connection 138 of the tube 136 to the second component 134 is side loaded when the tube 136 has been repositioned. An embodiment of this invention is shown in FIG. 8. The bend radius (not shown) of the first formed bend 250, the second formed bend 254, and the third formed bend 258 has been increased over the bend radius of the first formed bend 150, the second formed bend 154, and the third formed bend 158, respectively, shown in FIG. 7. The length of the second substantially straight section 152, 252 and the length of the third substantially straight section 156, 256 have been adjusted. The bend angle 182, 282 of the second formed bend 154, 254 has been increased. These changes have reduced the side loading on the connection 138, 238 to the second component 134, 234. The adjustment in the substantially straight section length 252, 256 combined with the increased second formed bend angle 282 and the changes in the formed bend radius (not shown) of each of the three formed bends 250, 254, 258 has resulted in a tube 236 with more elasticity in the formed bends 250, 254, 258.

Referring to FIGS. 3, 6, and 9, an aspect of the invention is illustrated where the unconstrained formed bend angle (see FIG. 3, 82) of the second formed bend 354 combined with the substantially straight sections 352, 356 so that when the unconstrained second formed bend angle 82 is greater than about 50 degrees, optionally about 70 degrees, optionally about 90 degrees, optionally about 120 degrees, optionally about 150 degrees, optionally greater than 180 degrees, optionally greater than about 220 degrees, or optionally greater than about 270 degrees, and when the substantially straight sections 352, 356 have a length (see FIG. 3, 72, 74) of at least about twice times the tube outer diameter 46 of the respective substantially straight section 352, 356 in length, optionally at least about three times the tube outer diameter 46 of the respective substantially straight section 352, 356 in length, or optionally at least about four times the tube outer diameter 46 of the respective substantially straight section 352, 356 in length, the substantially straight sections 352, 356 can apply a force on the unconstrained second formed bend 354 causing the second formed bend 354 to increase 82a or decrease 82b in bend angle 82, optionally increase 84b or decrease 84a the bend radius 84, and optionally bend 394 at least one portion 393 of the second formed bend 354b out of the plane of the unconstrained formed bend 354.

Figure 10:
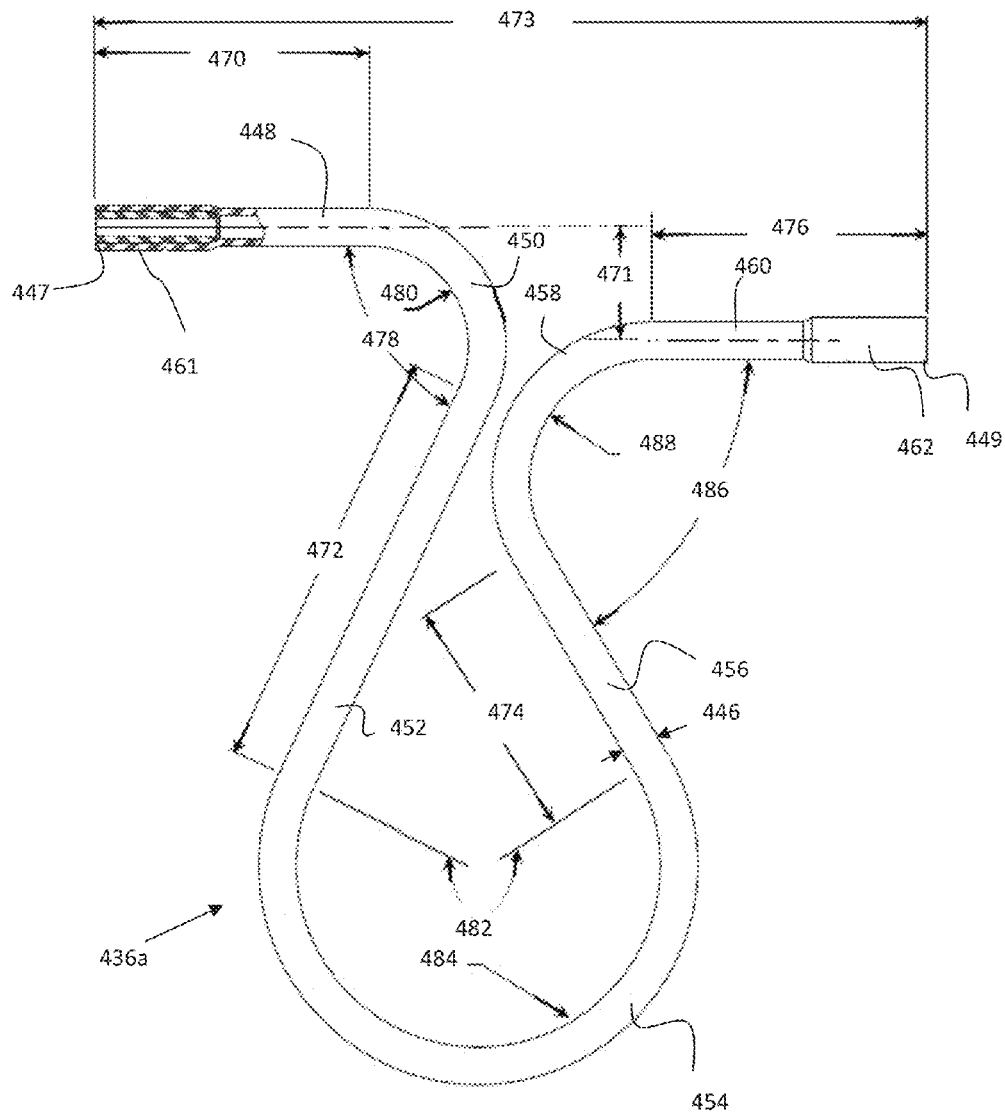
FIG. 10 shows a top view of another embodiment of the water line tube.

FIG. 10 illustrates another embodiment of a tube 436a with substantially straight connectors 461, 462 formed oriented in line with the first substantially straight section 448 and the fourth substantially straight section 460, respectively, of the tube 436a. The connectors 461, 462 lack a separate nozzle. The second substantially straight section 452 and the third substantially straight sections 474 have lengths 472, 474 such that there is an offset 471 between the position of the first tube end 447 and the second tube end 449. Both the first tube end 447 and the second tube end 449 are oriented parallel to one another.

Figure 11:
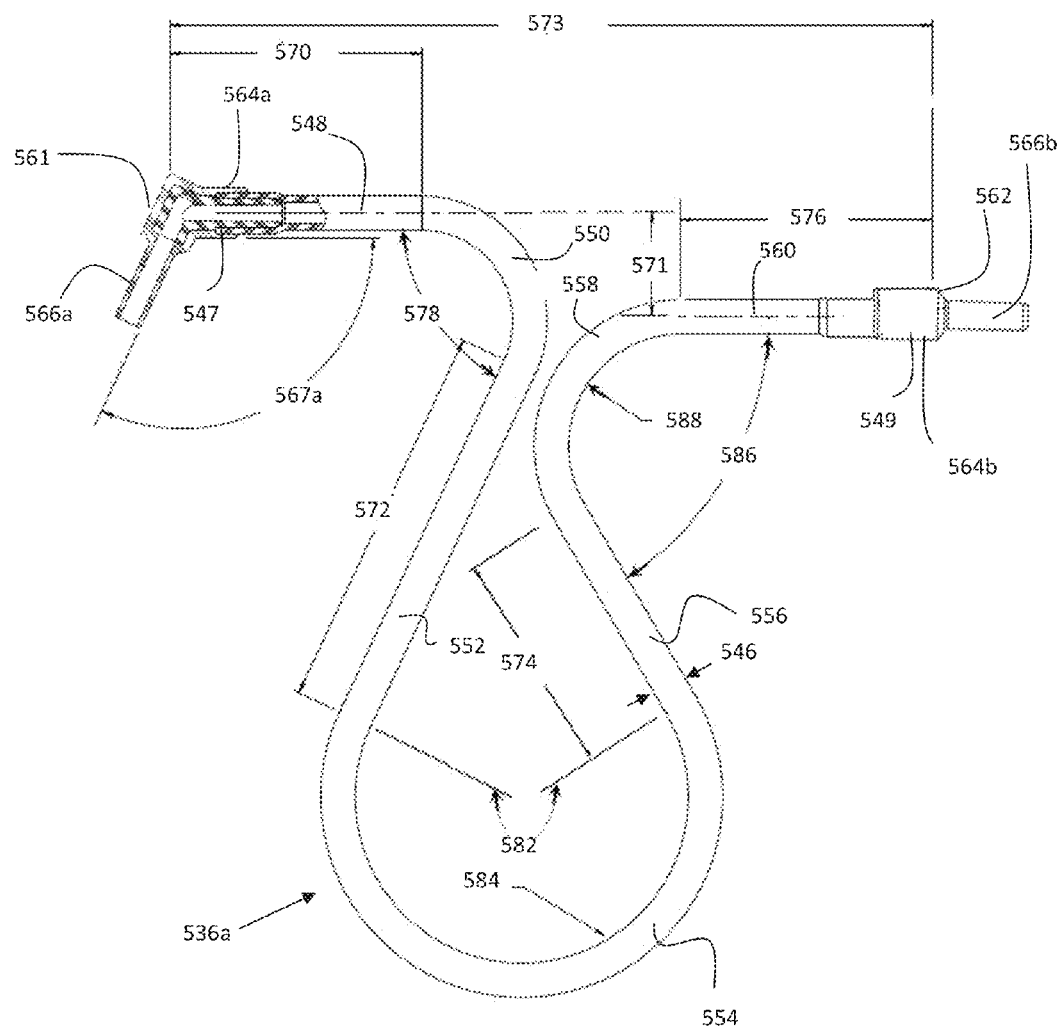
FIG. 11 shows a top view of another embodiment of the water line tube.

FIG. 11 illustrates another embodiment of a tube 536a where the first tube end 547 has an connector 561 with a substantially straight connector portion 564a oriented in line with the first substantially straight section 548 of the tube 536a and a nozzle portion 566a at an angle 567a to the substantially straight connector portion 564a. The second tube end 549 illustrates an connector 562 with a substantially straight connector portion 564b oriented in line with the fourth substantially straight section 560 of the tube 536a and a nozzle portion 566b in line with the substantially straight connector portion 564b. The second substantially straight section 552 and the third substantially straight section 556 have lengths 572, 574 such that there is an offset 571 between the position of the first tube end 547 and the second tube end 549. Both the first tube end 547 and the second tube end 549 are oriented parallel to one another.

Figure 12:
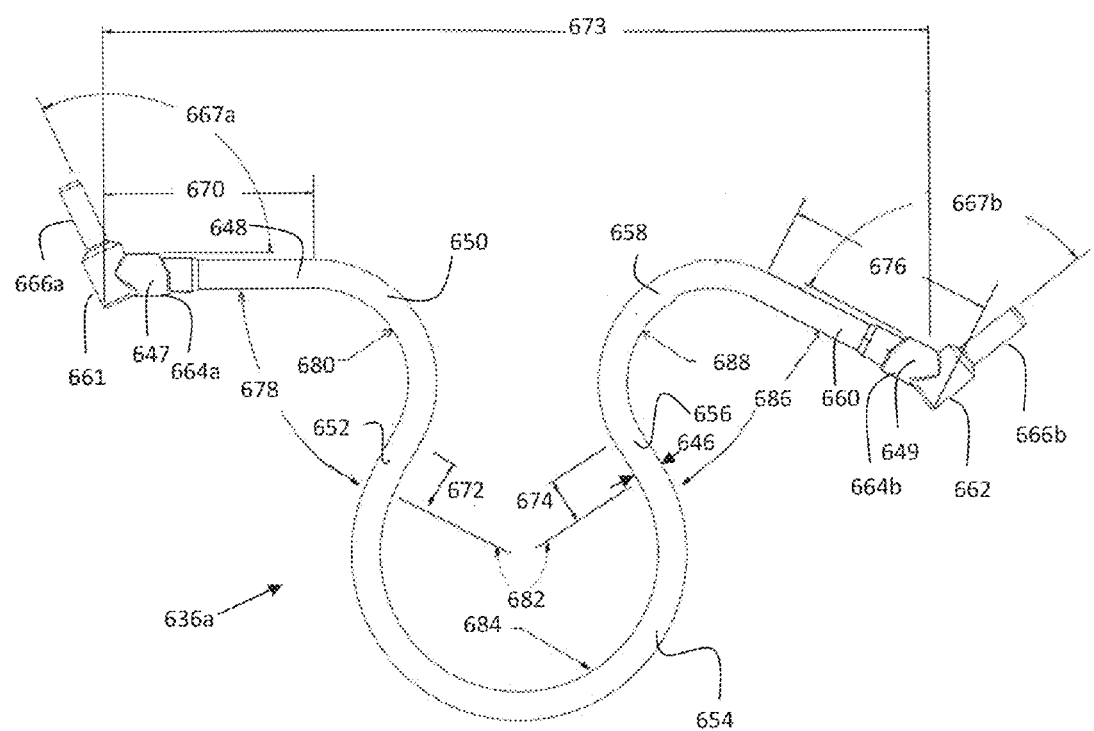
FIG. 12 shows a top view of another embodiment of the water line tube.

FIG. 12 illustrates another embodiment of a tube 636a where the first tube end 647 and the second tube end 649 each have attached connectors 661, 662. Each of the connectors 661, 662 has a substantially straight portion 664a, 664b of the connector 661, 662 and a nozzle portion 666a, 666b of the connector 661, 662. The nozzle portion 666a, 666b of the connectors 661, 662 are shown at an angle 667a, 667b to the straight portion 664a, 664b of each connector 661, 662. The first substantially straight section 648 of the tube 636a and the fourth substantially straight section 660 of the tube 636a are oriented non-parallel. The first formed bend 650 has an unconstrained bend angle 678 of less than 90 degrees. The second formed bend 654 has an unconstrained bend angle 682 of about 260 degrees. The second substantially straight section 652 and the third substantially straight section 656 have lengths 672, 674 of approximately about the same length.

Figure 13:
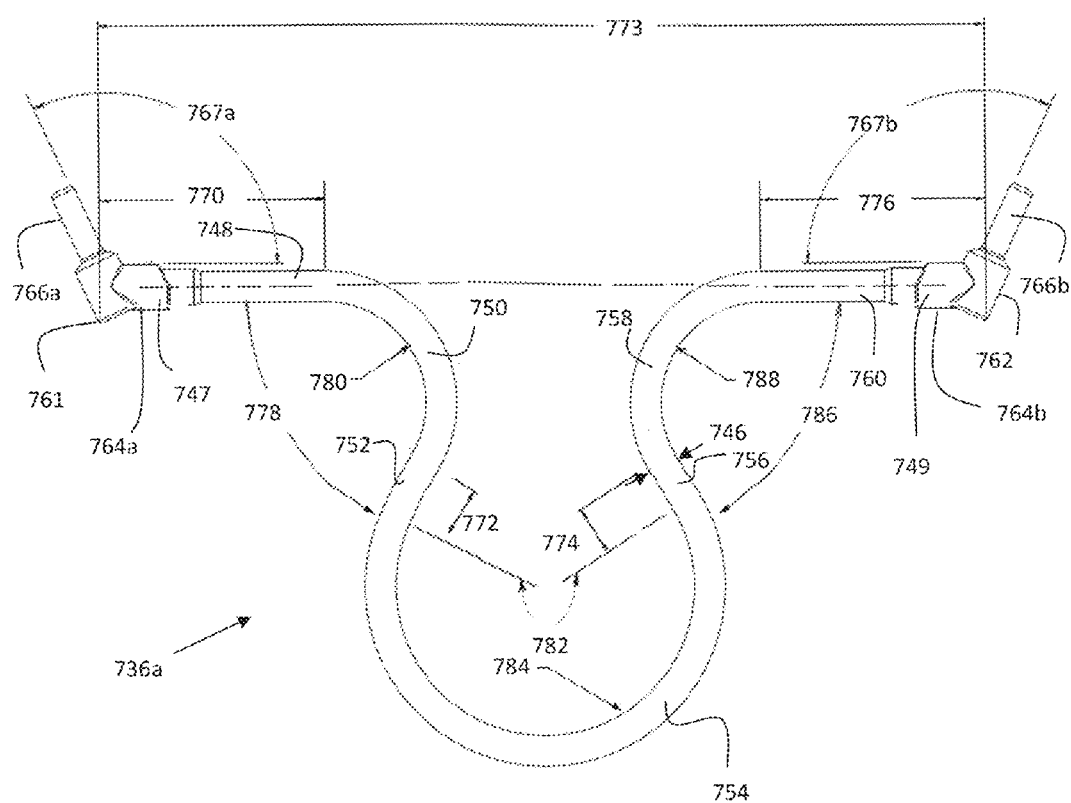
FIG. 13 shows a top view of another embodiment of the water line tube.

FIG. 13 illustrates another embodiment of a tube 736a where the first tube end 747 and the second tube end 749 both have attached connectors 761, 761 with a nozzle portion 766a, 766b. The first substantially straight section 748 of the tube 736a is oriented approximately in line and parallel with the fourth substantially straight section 760 of the tube 736a. The first formed bend 750 has an unconstrained bend angle 778 and unconstrained bend radius 780 of approximately the same amounts as the unconstrained bend angle 786 and the unconstrained bend radius 788, respectively, of the third formed bend 758. The second substantially straight section 752 and the third substantially straight section 756 have lengths approximately about the same length.

Figure 14:
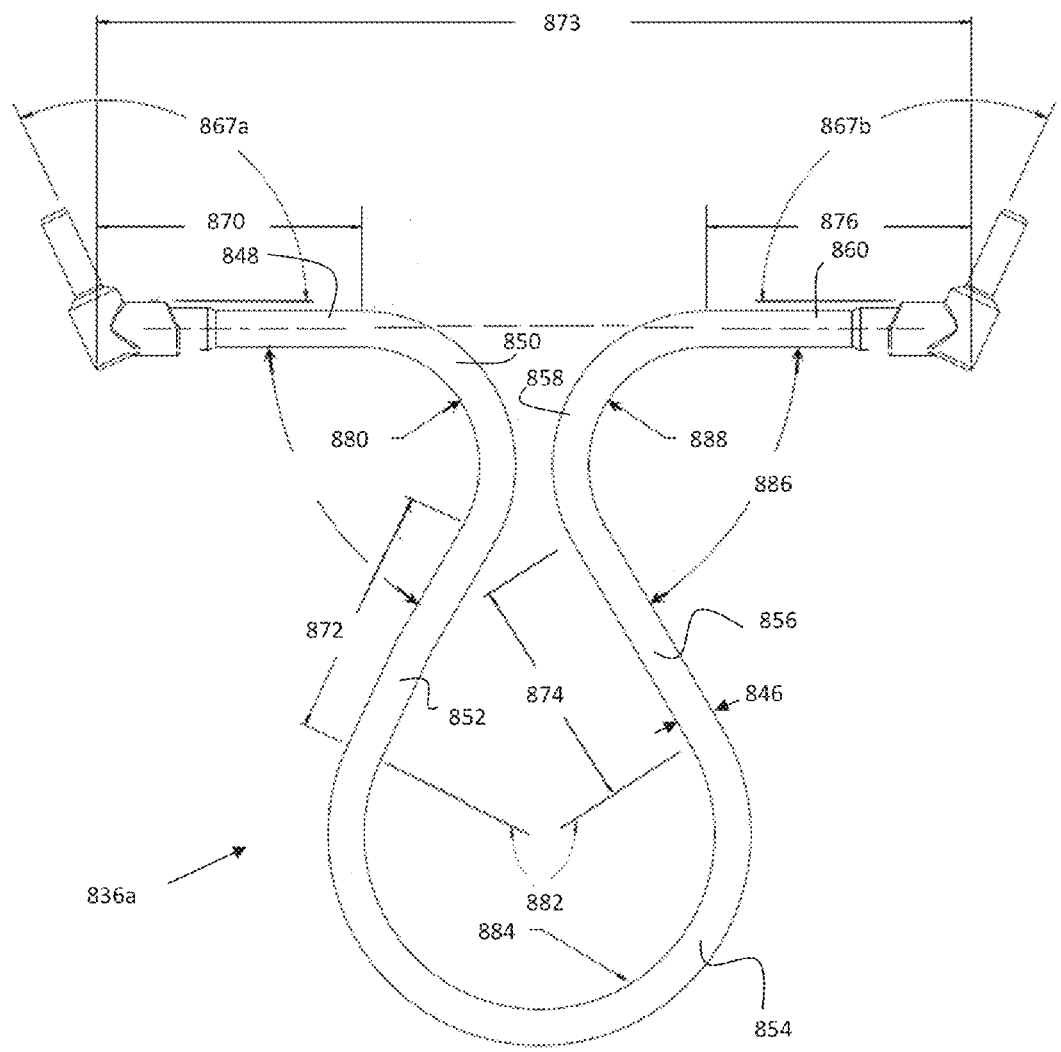
FIG. 14 shows a top view of another embodiment of the water line tube.

FIG. 14 illustrates another embodiment of a tube 836a with similar features to the embodiment shown in FIG. 13. In both FIGS. 13 and 14, the second substantially straight section 752, 852 and the third substantially straight section 756, 856, respectively, have lengths approximately about the same length. The approximate lengths 772, 774 and 872, 874 are longer in the embodiment shown in FIG. 14 than the embodiment shown in FIG. 13.

FIG. 15 illustrates another embodiment of a tube 936a where one of the first formed bend 50 and the third formed bend 58 from FIG. 3 has been replaced by a substantially straight section 79.

Figure 16:
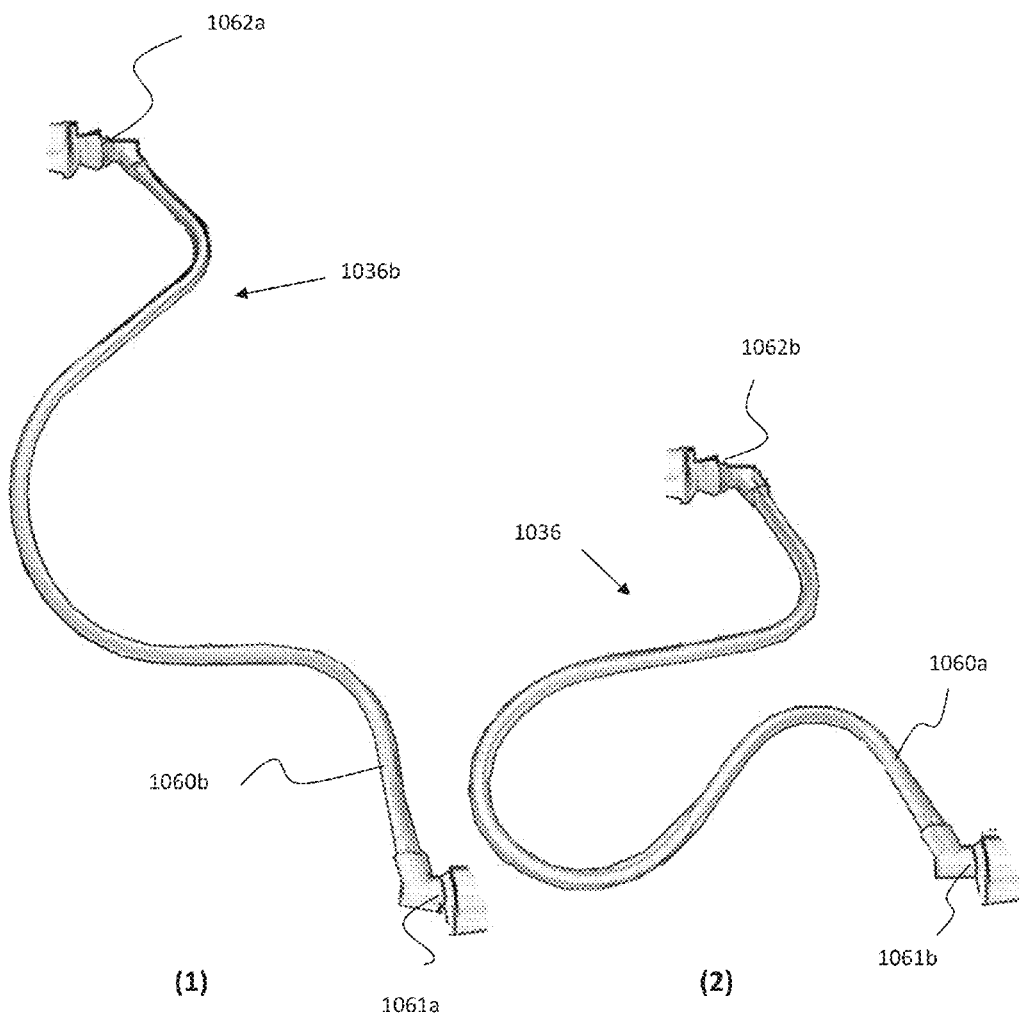
FIG. 16 shows a top perspective view of another embodiment of the water line tube in the retracted position and in the extended position.

FIG. 16 illustrates another embodiment of a tube 1036 in the extended position 1036b (FIG. 16(1)) and the retracted position 1036 (FIG. 16(2)).

Figure 17:
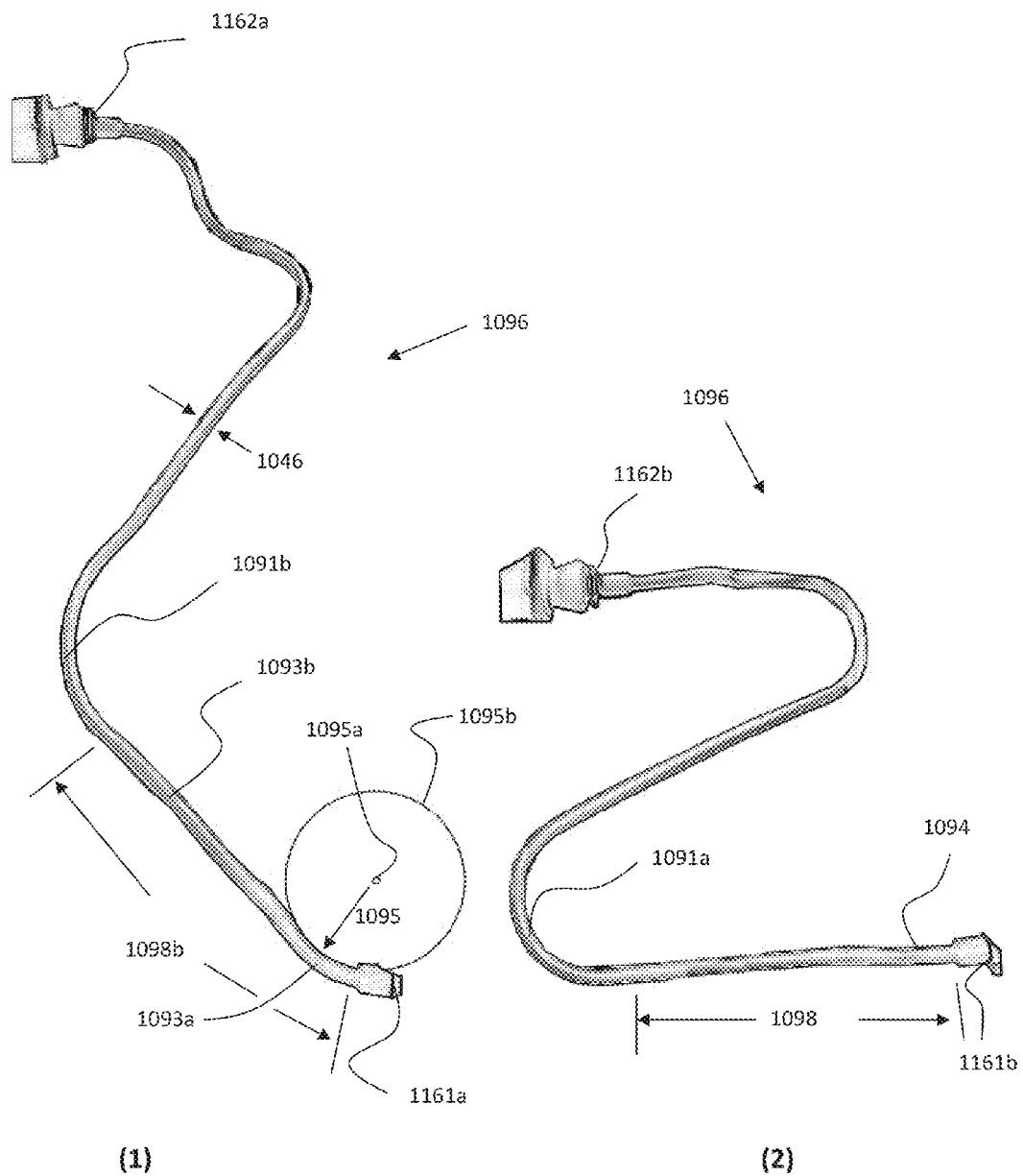
FIG. 17 shows a top perspective view of a related tube in the retracted position and in the extended position.

FIG. 17 illustrates a related but inferior tube 1096 in the extended position (FIG. 17(1)) and the related tube 1096 in the retracted position (FIG. 17(2)). The tube 1096 shows the contour of the tube Whirlpool part number 2317912. The change in contour of the formed bend 1091a when the tube 1096 is moved from the retracted position (FIG. 17(2)) to the extended position (FIG. 17(1)) demonstrates the ability of the formed bend 1091a to change in at least one of a bend radius and a bend angle when placed under load. The substantially straight section 1098 of the tube 1096 in the retracted position (FIG. 17(2)) splits into a substantially straight section 1093b and a substantially arcuate section 1093a when the tube 1096 is moved to the extended position (FIG. 17(1)). The substantially straight section 1098 is not substantially straight as shown by the section 1098b in the extended tube 1096 (FIG. 17(1)). Thus the tube 1096 as a whole is not "elastically rigid" since at least one substantially straight section 1094 of the tube 1096 does not resist changing shape from a substantially straight section 1094 into a substantially arcuate section 1093a when a side load force is applied to a substantially straight section 1094 of the tube 1096. The Whirlpool part number 2317912 tube is an example of a tube having formed bends having elastically rigid properties where the tube as a whole is not "elastically rigid".

Referring again to FIGS. 16 and 17, even though the tube 1096 has a similar retracted position (FIG. 17(2)) and a similar extended position (FIG. 17(1)) for the tube ends (1161a,b and 1162a,b), as the tube 1036 (FIGS. 16 (1) and (2), 1061a,b and 1062a,b), and further the formed bend 1091 will change at least one of a bend radius and a bend angle, the tube 1096 does not act as a linkage since at least one of the straight sections 1098 is insufficiently rigid. The stress in the tube 1096 is concentrated in the location 1094 resulting in the formation of a temporary arcuate section 1093a and an unintended pivot point. The arcuate section 1093a has an arcuate projected circle 1095b with a center point 1095a. There may be unacceptable stress induced into the tube 1096 in the area of 1093a since the bend radius 1095 is only about four times the tube outer diameter 1046 and there is not a substantially straight section of at least twice the tube outer diameter 1046 in length between the apparent end of the arcuate section 1093a and the connector 1161a. Redesigning the tube 1036 using the principles of a linkage with constrained pivot points allows for a tube 1036 that will move between the retracted position (FIG. 16(2)) and the extended position (FIG. 16(1)) without resulting in the formation of bends in the substantially straight section 1060b or without resulting in unacceptable stress at the connections 1061a, 1062a. The flexibility of motion in the tube 1036 has been increased over the tube 1096. The tube 1036 can accommodate changes in connection locations, tolerance stackup, and changes in the position of the components in the machine compartment. One would not appreciate that in order to make a tube with increased flexibility in motion, the rigidity of the tube needs to be increased. One would expect that increasing the rigidity of the tube would result in a tube with reduced flexibility in motion.

By using the principles of a linkage and treating formed bends as constrained pivot points and using substantially straight sections with sufficient rigidity to maintain the substantially straight section shape, the flexibility of motion of a tube can be increased while reducing the stress on the tube and reducing the stress on the tube connections.

The above description is considered that of the preferred embodiment only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. An appliance comprising: a machine compartment having a machine compartment opening, the machine compartment comprising:
    a first component,
    a second component, and
    a tube, the tube comprising:
        a tube outer diameter,
        a first tube end,
        a second tube end,
        a passage there though to carry at least one of a fluid or a gas,
        a first substantially straight section adjacent the first tube end,
        a first formed bend adjacent the first substantially straight section,
        a second substantially straight section adjacent the first formed bend,
        a second formed bend adjacent the second substantially straight section,
        a third substantially straight section adjacent the second formed bend,
        a third formed bend adjacent the third substantially straight section, and
        a fourth substantially straight section adjacent the third formed bend and adjacent the second tube end;
    wherein the tube is at least partially elastically rigid; and
    wherein the first tube end is fluidically attached to the first component; and
    wherein the second tube end is fluidically attached to the second component; and
    wherein at least one of the first component and the second component is at least partially removable from the machine compartment while the tube is still fluidically connected to both the first component and the second component.

2. The appliance in claim 1, wherein the tube outer diameter is between about 6 mm and about 10 mm inclusive and wherein the tube has a minimum allowed bend radius of a straight section of tube between about 5 to about 10 inclusive times the tube outer diameter.

3. The appliance of claim 1, wherein at least one of the first tube end and the second tube end has a connector attached to the at least one of the first tube end and the second tube end.

4. The appliance of claim 1, wherein at least one of the first tube end and the second tube end has a connector attached to the at least one of the first tube end and the second tube end, and further wherein the connector comprises:
    a connector straight section and
    a nozzle,
    wherein the connector straight section is attached to the at least one of the first tube end and the second tube end, and
    wherein the nozzle is oriented at an angle greater than 90 degrees to the connector straight section.

5. The appliance of claim 1, wherein at least one of the first formed bend and the third formed bend has an unconstrained bend radius between about 2.5 to about 6 inclusive times the tube outer diameter.

6. The appliance of claim 1, wherein the second formed bend has an unconstrained bend radius of between about 4 to about 8 inclusive times the tube outer diameter.

7. The appliance of claim 1, wherein at least one of the first formed bend and the third formed bend has an unconstrained bend angle of less than about 90 degrees, and wherein the second formed bend has an unconstrained bend angle greater than about 180 degrees.

8. The appliance of claim 1, wherein where the first, the second, the third, and the fourth substantially straight sections are each at least about 2 times the tube outer diameter in length.

9. The appliance of claim 1, wherein the tube is formed at least in part from a material selected from a group consisting of high density polyethylene, cross-linked polyethylene (PEX), pre-formed PEX tubing, polyacetals, poly(meth) acrylics, polyarylether ketones, polyether ketones, polyacrylonitrile resins, polyamides, polyamide-imides, polyacrylates, polybutene resins, polycarbonates, polyalkylene terephthalates, polyetherimides, polyethylene homopolymers, polyethylene copolymers, polypropylene homopolymers, polypropylene copolymers, ethylene acid copolymers, ethylene-vinyl acetate copolymers, ethylene-vinyl alcohol copolymers, polyimides, polyphenylene oxides, polyphenylene sulfides, acrylonitrile butadiene styrene terpolymers, polystyrenes, styrene-acrylonitrile copolymers, styrene-butadiene copolymers, styrene maleic anhydride copolymers, polyarylsulfones; polyethersulfones; polysulfones, thermoplastic styrenic block copolymers, thermoplastic polyolefin blends, thermoplastic elastomeric alloys, thermoplastic polyurethanes, thermoplastic copolyesters, thermoplastic polyamides, polyvinyl chlorides, chlorinated polyvinyl chlorides, polyvinylidene chlorides, allyl thermosets of allyl esters, bis-maleimides, epoxy resins, phenolic resins, unsaturated thermoset polyesters, thermoset polyimides, polyurethanes, urea and melamine formaldehyde resins.

10. A tube for an appliance, the tube comprising:
    a tube outer diameter,
    a first tube end,
    a second tube end,
    a passage there though to carry at least one of a fluid or a gas,
    a first substantially straight section adjacent the first tube end,
    a first formed bend adjacent the first substantially straight section,
    a second substantially straight section adjacent the first formed bend,
    a second formed bend adjacent the second substantially straight section,
    a third substantially straight section adjacent the second formed bend,
    a third formed bend adjacent the third substantially straight section, and
    a fourth substantially straight section adjacent the third formed bend and adjacent the second tube end;
    wherein the tube is at least partially elastically rigid.

11. The tube in claim 10, wherein the tube outer diameter is between about 6 mm and about 10 mm inclusive and wherein the tube has a minimum allowed bend radius of a substantially straight section of tube between about 5 to about 10 inclusive times the tube outer diameter.

12. The tube of claim 10, wherein at least one of the first tube end and the second tube end has a connector attached to the at least one of the first tube end and the second tube end.

13. The tube of claim 10, wherein at least one of the first tube end and the second tube end has a connector attached to the at least one of the first tube end and the second tube end, and further wherein the connector comprises:
 a connector straight section and
 a nozzle,
 wherein the connector straight section is attached to the at least one of the first tube end and the second tube end, and
 wherein the nozzle is oriented at an angle greater than about 90 degrees to the connector straight section.

14. The tube of claim 10, wherein at least one of the first formed bend and the third formed bend has an unconstrained bend radius between about 2.5 to about 5 inclusive times the tube outer diameter.

15. The tube of claim 10, wherein the second formed bend has an unconstrained bend radius of between about 4 to about 8 inclusive times the tube outer diameter.

16. The tube of claim 10, wherein at least one of the first formed bend and the third formed bend has an unconstrained bend angle of less than about 90 degrees, and wherein the second formed bend has an unconstrained bend angle greater than about 180 degrees.

17. The tube of claim 10, wherein where the first, the second, the third, and the fourth substantially straight sections are each at least about 2 times the tube outer diameter in length.

18. The tube of claim 10, wherein the tube is formed at least in part from a material selected from a group consisting of high density polyethylene, cross-linked polyethylene (PEX), pre-formed PEX tubing, polyacetals, poly(meth)acrylics, polyarylether ketones, polyether ketones, polyacrylonitrile resins, polyamides, polyamide-imides, polyacrylates, polybutene resins, polycarbonates, polyalkylene terephthalates, polyetherimides, polyethylene homopolymers, polyethylene copolymers, polypropylene homopolymers, polypropylene copolymers, ethylene acid copolymers, ethylene-vinyl acetate copolymers, ethylene-vinyl alcohol copolymers, polyimides, polyphenylene oxides, polyphenylene sulfides, acrylonitrile butadiene styrene terpolymers, polystyrenes, styrene-acrylonitrile copolymers, styrene-butadiene copolymers, styrene maleic anhydride copolymers, polyarylsulfones; polyethersulfones; polysulfones, thermoplastic styrenic block copolymers, thermoplastic polyolefin blends, thermoplastic elastomeric alloys, thermoplastic polyurethanes, thermoplastic copolyesters, thermoplastic polyamides, polyvinyl chlorides, chlorinated polyvinyl chlorides, polyvinylidene chlorides, allyl thermosets of allyl esters, bismaleimides, epoxy resins, phenolic resins, unsaturated thermoset polyesters, thermoset polyimides, polyurethanes, urea and melamine formaldehyde resins.

19. A tube for an appliance, the tube comprising:
 a tube outer diameter,
 a first tube end,
 a second tube end,
 a passage there though to carry at least one of a fluid or a gas,
 at least three substantially straight sections in the tube and at least two formed bends in the tube,
 wherein the at least three substantially straight sections and the at least two formed bends allow the tube to move substantially as a linkage with the at least two formed bends acting substantially as constrained pivot points, and
 wherein the tube is at least partially elastically rigid.

20. The tube in claim 19, wherein the tube is a water line tube.

* * * * *